United States Patent
Kinugawa et al.

(10) Patent No.: US 9,556,775 B2
(45) Date of Patent: Jan. 31, 2017

(54) REDUCING AGENT SUPPLYING DEVICE

(71) Applicant: DENSO CORPORATION, Kariya, Aichi-pref. (JP)

(72) Inventors: Masumi Kinugawa, Okazaki (JP); Shigeto Yahata, Toyoake (JP); Yuuki Tarusawa, Kariya (JP); Yusuke Majima, Kariya (JP); Mao Hosoda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/743,146

(22) Filed: Jun. 18, 2015

(65) Prior Publication Data

US 2015/0369102 A1    Dec. 24, 2015

(30) Foreign Application Priority Data

Jun. 20, 2014    (JP) .................. 2014-127026

(51) Int. Cl.
*F01N 3/00*        (2006.01)
*F01N 3/20*        (2006.01)
(Continued)

(52) U.S. Cl.
CPC ............ *F01N 3/208* (2013.01); *F01N 3/0814* (2013.01); *F01N 3/0842* (2013.01); *F01N 3/0871* (2013.01); *F01N 3/106* (2013.01); *F01N 3/2033* (2013.01); *F01N 3/2073* (2013.01); *F01N 9/00* (2013.01); *F01N 2240/30* (2013.01); *F01N 2240/38* (2013.01); *F01N 2610/03* (2013.01); *F01N 2610/08* (2013.01);

(Continued)

(58) Field of Classification Search
USPC .................. 60/274, 275, 286, 289, 292, 295, 301,60/303, 297
See application file for complete search history.

(56) References Cited

U.S. PATENT DOCUMENTS 6,363,716 B1 *    4/2002    Balko ................ B01D 53/9431
                                                   422/183
6,823,662 B1 *    11/2004   Yamamoto ......... B01D 53/8631
                                                   123/3

(Continued)

FOREIGN PATENT DOCUMENTS

JP          3531489         3/2004
JP          2009-162173     7/2009

*Primary Examiner* — Binh Q Tran
(74) *Attorney, Agent, or Firm* — Nixon & Vanderhye P.C.

(57) ABSTRACT

A reducing agent supplying device is for a fuel combustion system that includes a NOx purifying device with a reducing catalyst arranged in an exhaust passage to purify NOx contained in exhaust gas of an internal combustion engine. The reducing agent supplying device supplies a reducing agent into the exhaust passage at a position upstream of the reducing catalyst. The reducing agent supplying device includes a reforming portion and a reformation suppressing portion. The reforming portion reforms the reducing agent by partially oxidizing the reducing agent. When a temperature of the reducing agent is higher than a first specified temperature that is equal to or higher than an activation temperature of the reducing catalyst, the reformation suppressing portion (i) suppresses the degree of reformation of the reducing agent in comparison with when a temperature of the reducing agent is lower than the first specified temperature, or (ii) stops the reformation of the reducing agent.

6 Claims, 19 Drawing Sheets

(51) Int. Cl.
- *F01N 3/08* (2006.01)
- *F01N 3/10* (2006.01)
- *F01N 9/00* (2006.01)

(52) U.S. Cl.
CPC ............... *F01N 2900/1404* (2013.01); *F01N 2900/1602* (2013.01); *Y02T 10/26* (2013.01); *Y02T 10/47* (2013.01)

(56) References Cited

U.S. PATENT DOCUMENTS

| | | | |
|---|---|---|---|
| 7,093,428 B2 * | 8/2006 | LaBarge | B01D 53/9495 60/286 |
| 7,240,484 B2 * | 7/2007 | Li | F01N 3/021 60/286 |
| 7,484,358 B2 * | 2/2009 | Cho | C10L 1/02 60/274 |
| 8,434,296 B2 * | 5/2013 | Wada | B01D 53/9409 60/285 |
| 8,607,743 B2 * | 12/2013 | Yahagi | F02D 19/081 123/2 |
| 2010/0257845 A1 | 10/2010 | Iwamoto et al. | |
| 2014/0260208 A1 | 9/2014 | Sato et al. | |

* cited by examiner

REDUCING AGENT SUPPLYING DEVICE

CROSS REFERENCE TO RELATED APPLICATION

This application is based on and incorporates herein by reference Japanese Patent Application No. 2014-127026 filed on Jun. 20, 2014.

TECHNICAL FIELD

The present disclosure relates to a reducing agent supplying device for supplying a reducing agent used for NOx reduction into an exhaust passage at a position upstream of a reducing catalyst.

BACKGROUND

Generally, NOx (Nitrogen Oxides) contained in exhaust gas of an internal combustion engine is purified in reaction of the NOx with a reducing agent in the presence of a reducing catalyst disposed inside an exhaust passage. For example, a Patent Literature (JP 2009-162173 A) discloses a purifying system that reforms a reducing agent by partially oxidizing the reducing agent through a plasma discharging process. The purifying system supplies the reducing agent that has an enhanced reducing capacity by the reformation into an exhaust passage at a position upstream of a reducing catalyst. By reforming the reducing agent, a NOx purification rate may be improved.

SUMMARY

However, according to the study by the inventors of the present disclosure, if the reformation of the reducing agent is executed with the reducing catalyst at a high temperature that is much higher than the activation temperature of the reducing catalyst, the NOx purification rate may be rather deteriorated. That is, the oxidation process for the reformed agent that has been partially oxidized is further accelerated under such a high temperature environment, and thus the reformed agent may be fully oxidized. When the reducing agent is fully oxidized, the reducing agent is decomposed into carbon dioxide and water (oxidative deterioration) and thus loses its NOx reducing property, resulting in decreasing the NOx purification rate.

It is an objective of the present disclosure to provide a reducing agent supplying device having an improved NOx purification rate.

In a present disclosure, a reducing agent supplying device is for a fuel combustion system that includes a NOx purifying device with a reducing catalyst arranged in an exhaust passage to purify NOx contained in exhaust gas of an internal combustion engine. The reducing agent supplying device supplies a reducing agent into the exhaust passage at a position upstream of the reducing catalyst. The reducing agent supplying device includes a reforming portion and a reformation suppressing portion. The reforming portion reforms the reducing agent by partially oxidizing the reducing agent. When a temperature of the reducing agent is higher than a first specified temperature that is equal to or higher than an activation temperature of the reducing catalyst, the reformation suppressing portion (i) suppresses the degree of reformation of the reducing agent in comparison with when a temperature of the reducing agent is lower than the first specified temperature, or (ii) stops the reformation of the reducing agent.

In view of the above finding that "if the reformation of the reducing agent is executed with the reducing catalyst at a high temperature that is much higher than the activation temperature of the reducing catalyst, the NOx purification rate may be rather deteriorated", the degree of reformation is suppressed or the reformation is stopped when a temperature of the reducing catalyst is higher than the first specified temperature. Thus, it may be possible to avoid a situation where the reducing agent is decomposed through the oxidative deterioration and loses the NOx reducing capacity. Therefore, the NOx purification rate can be improved.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
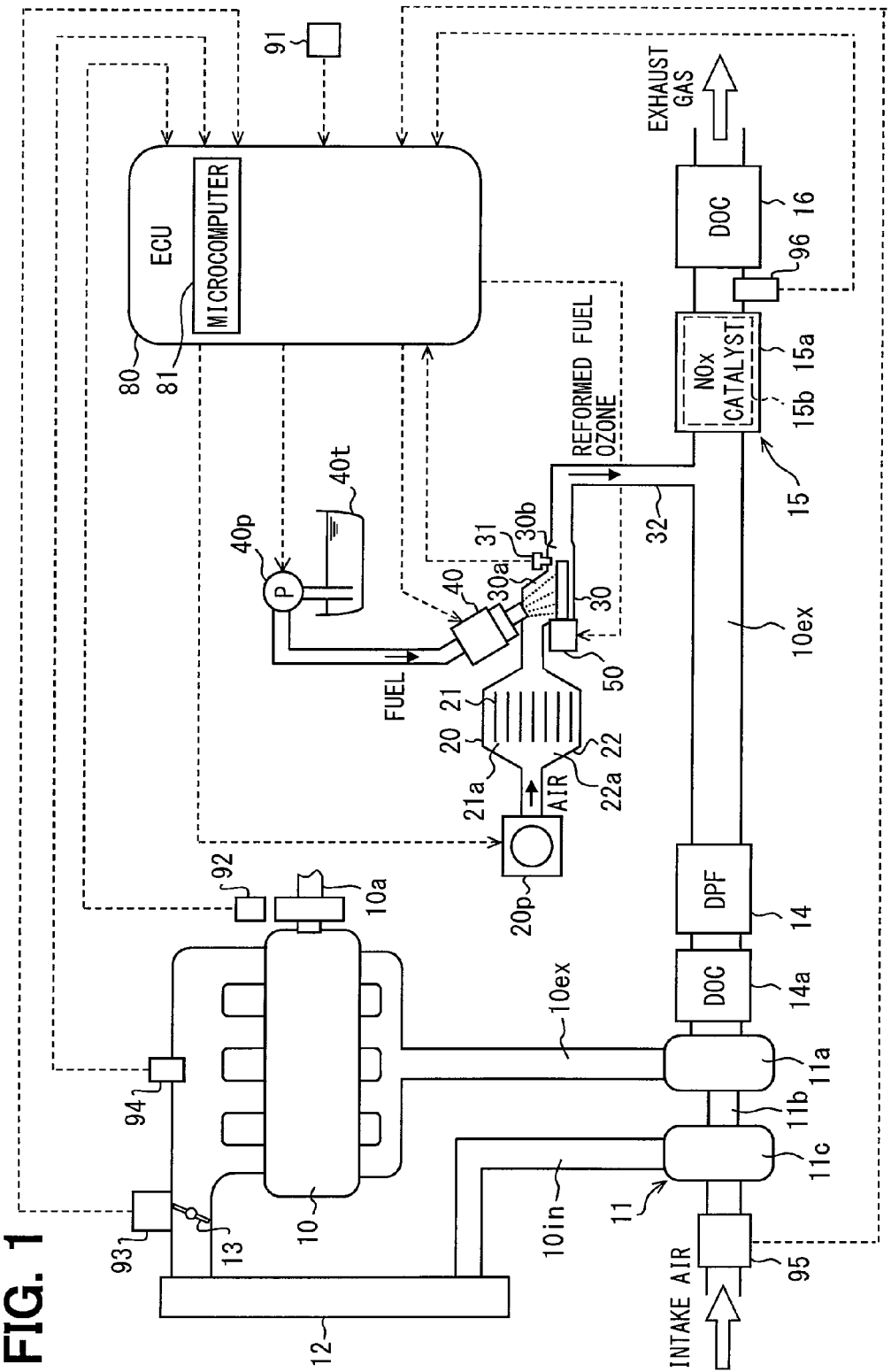
FIG. 1 is a schematic view of a reducing agent supplying device applied to a combustion system.

A plurality of embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A combustion system as illustrated in FIG. 1 includes an internal combustion engine 10, a supercharger 11, a diesel particular filter (DPF 14), a DPF regeneration device (regenerating DOC 14a), a NOx purifying device 15, a reducing agent purifying device (purifying DOC 16) and an reducing agent supplying device. The combustion system is mounted on a vehicle and the vehicle is powered by an output from the internal combustion engine 10. In the present embodiment, the internal combustion engine 10 is a compression self-ignition diesel engine using diesel fuel (light oil) for combustion.

The supercharger 11 includes a turbine 11a, a rotating shaft 11b and a compressor 11c. The turbine 11a is disposed in an exhaust passage 10ex for the internal combustion engine 10 and rotates by kinetic energy of exhaust gas. The rotating shaft 11b connects an impeller of the turbine 11a to an impeller of the compressor 11c and transmits a rotating force of the turbine 11a to the compressor 11c. The compressor 11c is disposed in an intake passage 10in of the internal combustion engine 10 and supplies intake air to the internal combustion engine 10 after compressing (i.e., supercharging) the intake air.

A cooler 12 is disposed in the intake passage 10in downstream of the compressor 11c. The cooler 12 cools intake air compressed by the compressor 11c, and the compressed intake air cooled by the cooler 12 is distributed into plural combustion chambers of the internal combustion engine 10 through an intake manifold after a flow amount of the compressed intake air is adjusted by a throttle valve 13.

The regenerating DOC 14a (Diesel Oxidation Catalyst), the DPF 14 (Diesel Particulate Filter), the NOx purifying device 15, and the purifying DOC 16 are disposed in this order in the exhaust passage 10ex downstream of the turbine 11a. The DPF 14 collects particulates contained in exhaust gas. The regenerating DOC 14a includes a catalyst that oxidizes unburned fuel contained in the exhaust gas and that burns the unburned fuel. By burning the unburned fuel, the particulates collected by the DPF 14 are burned and the DPF 14 is regenerated, whereby the collecting capacity of the DPF 14 is maintained. It should be noted that this burning by the unburned fuel inside the regenerating DOC 14a is not constantly executed but is temporarily executed when the regeneration of the DPF 14 is required.

A supply passage 32 of the reducing agent supplying device is connected to the exhaust passage 10ex downstream of the DPF 14 and upstream of the NOx purifying device 15. A reformed fuel generated by the reducing agent supplying device is supplied as a reducing agent into the exhaust passage 10ex through the supply passage 32. The reformed fuel is generated by partially oxidizing hydrocarbon (i.e., fuel), which is used as a reducing agent, into partially oxidized hydrocarbon, such as aldehyde, as will be described later with reference to FIG. 7.

The NOx purifying device 15 includes a honeycomb carrier 15b for carrying a reducing catalyst and a housing 15a housing the carrier 15b therein. The NOx purifying device 15 purifies NOx contained in exhaust gas through a reaction of NOx with the reformed fuel in the presence of the reducing catalyst, i.e., a reduction process of NOx into $N_2$. It should be noted that, although $O_2$ (oxygen) is also contained in the exhaust gas in addition to NOx, the reformed reducing agent selectively (preferentially) reacts with NOx in the presence of $O_2$.

In the present embodiment, the reducing catalyst has adsorptivity to adsorb NOx. More specifically, the reducing catalyst demonstrates the adsorptivity to adsorb NOx in the exhaust gas when a catalyst temperature is lower than an activation temperature at which reducing reaction by the reducing catalyst can occur. Whereas, when the catalyst temperature is equal to or higher than the activation temperature, NOx adsorbed by the reducing catalyst is reduced by the reformed fuel and then is released from the reducing catalyst. For example, the NOx purifying device 15 may provide NOx adsorption performance with a silver/alumina catalyst that is carried by the carrier 15b.

The purifying DOC 16 has a housing that houses a carrier carrying an oxidation catalyst. The purifying DOC 16 oxidizes the reducing agent, which flowed out from the NOx purifying device 15 without being used for NOx reduction, in the presence of the oxidation catalyst. Thus, the reducing agent can be prohibited from releasing into an atmosphere through an outlet of the exhaust passage 10ex. It should be noted that an activation temperature of the oxidation catalyst (e.g., 200° C.) is lower than the activation temperature (e.g., 250° C.) of the reducing catalyst.

Next, the reducing agent supplying device will be described below. Generally, the reducing agent supplying device generates the reformed fuel and supplies the reformed fuel into the exhaust passage 10ex through the supply passage 32. The reducing agent supplying device includes a discharging reactor 20, an air pump 20p, a reaction container 30, a fuel injector 40 and a heater 50. The reaction container 30 and the heater 50 may provide "reforming portion" that reforms fuel as the reducing agent by partially oxidizing the fuel.

Figure 2:
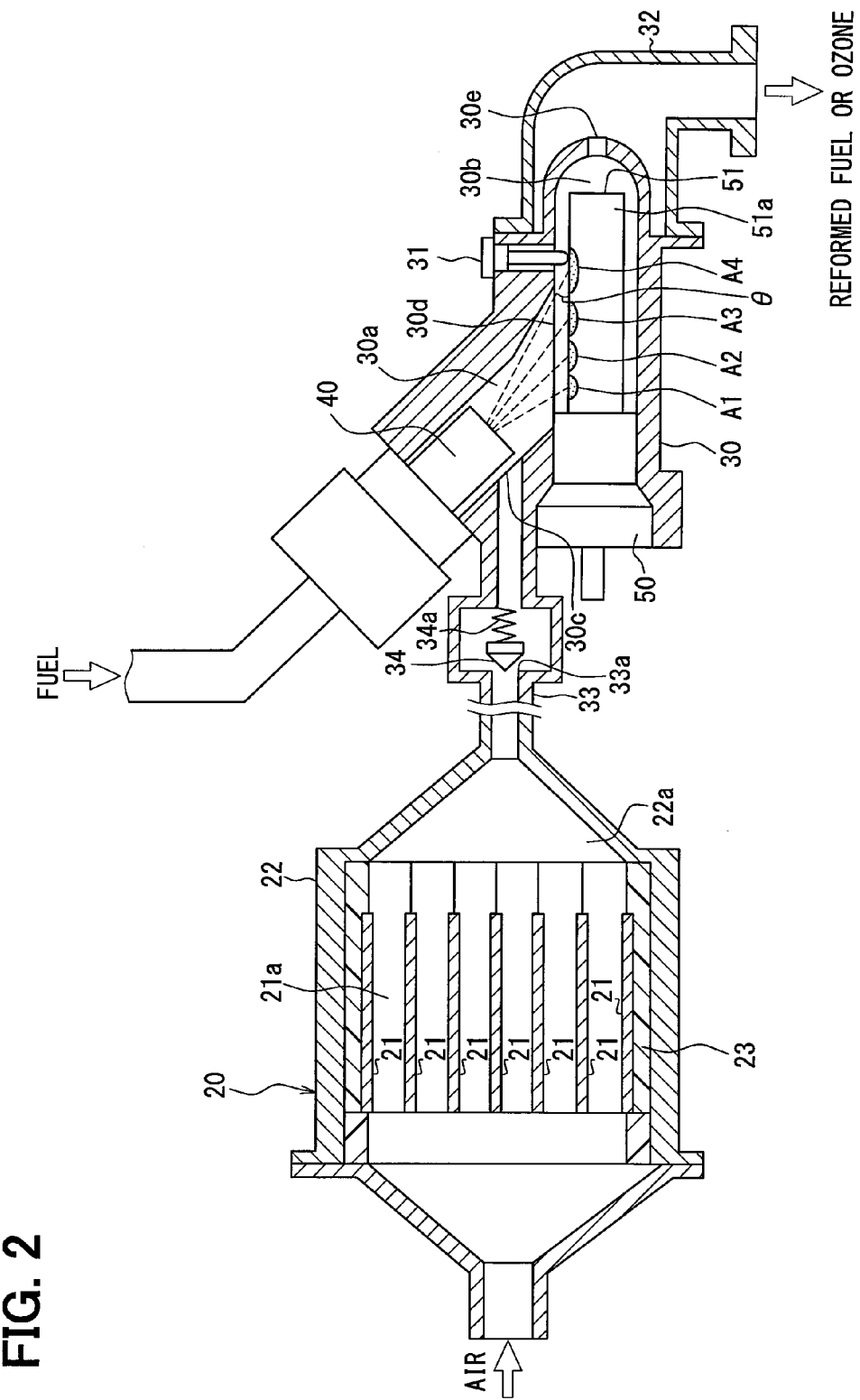
FIG. 2 is a cross-sectional view of the reducing agent supplying device.

As shown in FIG. 2, the discharging reactor 20 includes a housing 22 having a fluid passage 22a therein and a plurality of pairs of electrodes 21 are arranged inside the fluid passage 22a. More specifically, the electrodes 21 are held within the housing 22 through electric insulating members 23. The electrodes 21 have a plate shape and are arranged to face each other in parallel. One electrode 21, which is grounded, and the other electrode 21, which is applied with high voltage when electric power is supplied to the discharging reactor 20, are alternately arranged. Power application to the electrodes 21 is controlled by a microcomputer 81 of an electric control unit (ECU 80).

Air blown by the air pump 20p flows into the housing 22 of the discharging reactor 20. The air pump 20p is driven by an electric motor, and the electric motor is controlled by the microcomputer 81. The air blown by the air pump 20p flows into the fluid passage 22a within the housing 22, and flows through the discharging passages 21a formed between the electrodes 21.

The reaction container 30 is attached to a downstream side of the discharging reactor 20, and a fuel injection chamber 30a and a vaporizing chamber 30b are formed inside the reaction container 30. The fuel injection chamber 30a and the vaporizing chamber 30b may correspond to "reaction chamber" in which fuel is oxidized with oxygen inside air. An air inlet 30c is formed in the reaction container 30 and air that passed through the discharging passages 21a flows into the reaction container 30 through the air inlet 30c. The air inlet 30c is in communication with the fuel injection chamber 30a, and the fuel injection chamber 30a is in communication with the vaporizing chamber 30b through an opening 30d.

A check valve (valve) 34 is disposed in a connecting pipe 33 that fluidly connects the fluid passage 22a of the discharging reactor 20 to the air inlet 30c of the reaction container 30. The connecting pipe 33 may provide "air supply passage" through which air is supplied into the fuel injection chamber 30a. The check valve 34 is configured to open and close an internal passage of the connecting pipe 33 and prevents a backflow of air from the reaction container 30 to the discharging reactor 20.

More specifically, a valve seat 33a is formed on an internal wall of the connecting pipe 33, and the check valve 34 is pressed against the valve seat 33a by an elastic force of a spring 34a. Therefore, when a pressure on a side of the check valve 34 close to the reaction container 30 is higher than a pressure on a side of the check valve 34 close to the discharging reactor 20, the check valve 34 is operated to contact the valve seat 33a. Accordingly, a backflow of fuel together with air toward the discharging reactor 20 is prohibited when the fuel injector 40 injects fuel and the operation of the air pump 20p is stopped. Whereas, when the air pump 20p is operated, a pressure inside the fluid passage 22a is increased. Due to the increased pressure, the check valve 34 is operated to open the connecting pipe 33 against the elastic force of the spring 34a. In other words, when the pressure inside the fluid passage 22a higher than a pressure at the air inlet 30c by at least a given value, the check valve 34 is operated to open the connecting pipe 33.

Air that flowed through the discharging passages 21a and into the air inlet 30c passes through the fuel injection chamber 30a and the vaporizing chamber 30b in this order. Then, the air flows out from an injection port 30e that is formed in the reaction container 30. The injection port 30e is in fluid communication with the supply passage 32.

The fuel injector 40 is attached to the reaction container 30. Fuel in liquid form (liquid fuel) within a fuel tank 40t is supplied to the fuel injector 40 by a pump 40p, and injected into the fuel injection chamber 30a through injection holes D1, D2, D3 and D4 (refer to FIG. 3) of the fuel injector 40. The fuel within the fuel tank 40t is also used for combustion as described above, and thus the fuel is commonly used for combustion of the internal combustion engine 10 and used as the reducing agent. The fuel injector 40 has an injection valve and the valve is actuated by an electromagnetic force by an electromagnetic solenoid. The microcomputer 81 controls electric power supply (i.e., energization) to the electromagnetic solenoid.

The heater 50 is attached to the reaction container 30. The heater 50 has a heating element 51h, which generates heat when electric power is supplied, and a heat transfer cover 51, which houses the heating element 51h therein. The power supply (energization) to the heating element 51h is controlled by the microcomputer 81. An outer circumferential surface of the heat transfer cover 51 may serve as a heating surface 51a and a temperature of the heating surface 51a is increased by heating the heat transfer cover 51 by the heating element 51h. The heat transfer cover 51 has a cylindrical shape with a bottom and extends in a horizontal direction. More specifically, the heat transfer cover 51 extends in the horizontal direction in a state in which the reducing agent supplying device is mounted to a vehicle. That is, a center line Ch of the heat transfer cover 51 (refer to FIG. 4) extends in the horizontal direction.

The heating surface 51a is disposed inside the vaporizing chamber 30b and heats liquid fuel injected from the fuel injector 40. The liquid fuel heated by the heater 50 is vaporized inside the vaporizing chamber 30b. The vaporized fuel is further heated to a temperature equal to or higher than a predetermined certain temperature. As a result, fuel is thermally decomposed into hydrocarbon that has a small carbon number, i.e., cracking occurs.

Figure 3:
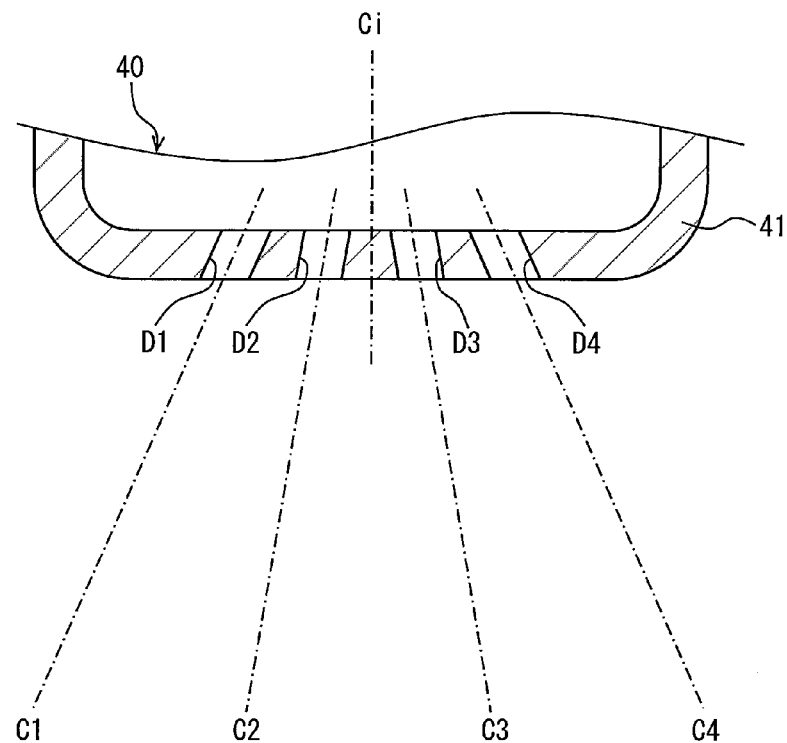
FIG. 3 is a cross-sectional view of a fuel injector illustrating a cross-sectional shape of injection holes.

The fuel injector 40 includes an injection hole plate 41 and the injection holes D1, D2, D3 and D4 are formed on the injection hole plate 41 (refer to FIG. 3). The injection holes D1, D2, D3 and D4 are arranged in a longitudinal direction of the heat transfer cover 51 (i.e., along the center line Ch). A center line Ci of the fuel injector 40 is angled relative to a vertical direction in a state in which the reducing agent supplying device is mounted to a vehicle. In other words, the center line Ch of the heater 50 is angled relative to the center line Ci of the fuel injector 40.

As shown in FIG. 3, the injection holes D1, D2, D3 and D4 have a shape extending linearly, i.e., the injection holes D1, D2, D3 and D4 have an axis that linearly extends. A cross section of each injection hole D1, D2, D3, D4 is a circle shape and the injection hole D1, D2, D3, D4 has a constant cross-sectional area. Each center line C1, C2, C3, C4 of the injection hole D1, D2, D3, D4 is angled relative to the center line Ci of the fuel injector 40. Fuel in liquid form (liquid fuel) is sprayed (atomized) through each injection hole D1, D2, D3, D4 and the splayed liquid fuel spreads in a substantially cone shape. In other words, a spray trajectory of the sprayed liquid fuel has a substantially cone shape spreading in a direction away from each injection hole D1, D2, D3, D4. In the present embodiment, a center line of the spray trajectory of the sprayed liquid fuel substantially corresponds to the center line C1, C2, C3, C4 of each injection hole D1, D2, D3, D4.

The sprayed liquid fuel from the injection holes D1 to D4 enters into the vaporizing chamber 30b through the opening 30d and is sprayed against the heating surface 51a. A crossing angle θ (refer to FIG. 2) formed between each center line C1, C2, C3, C4 and the heating surface 51a is an acute angle less than 90°. More specifically, the crossing angle θ is defined as an angle between the center line C1, C2, C3, C4 and a virtual horizontal surface of the heating surface 51a that virtually contacts an uppermost portion of the heating surface 51a. The injection hole D1 positioned at the uppermost stream side of the fuel injector 40 (i.e., the leftmost side in FIG. 2) provides the crossing angle θ having a maximum value, and the crossing angles θ respectively corresponding to the injection holes D2, D3, D4 decreases in this order toward a tip end of the heater 50 (i.e., a right direction in FIG. 2). The injection holes D1 to D4 are positioned above the heating surface 51a with respect to gravity.

Figure 4:
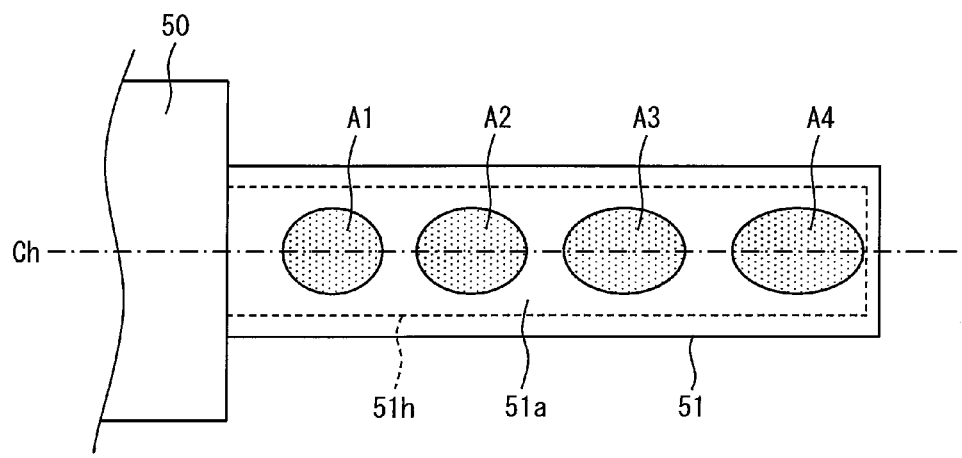
FIG. 4 is a schematic view of a projected area of a fuel spray on a heater heating surface.

Since the crossing angle θ is an acute angle, the sprayed liquid fuel diagonally reaches the heating surface 51a. Therefore, as shown in FIG. 4, sprayed regions A1, A2, A3, A4 of the heating surface 51a, onto which the liquid fuel from each injection hole D1, D2, D3, D4 is sprayed, have an elliptical shape with a longer axis along the center line Ch.

The longer axis of the sprayed region A1 corresponding to the crossing angle θ having a minimum value is the shortest axis, and the longer axis of the sprayed region A2, A3, A4 increases in this order along the center line Ch. In other words, the longer axis of each sprayed region A1, A2, A3, A4 increases as the corresponding crossing angle θ decreases. It should be noted that, when increasing a diameter of the injection hole D1, D2, D3, D4, or increasing a distance between the injection hole D1, D2, D3, D4 and the heating surface 51a, an area of the sprayed region A1, A2, A3, A4 may increase beyond an area of the heating surface 51a. In view of this, the diameter of the injection hole D1, D2, D3, D4 and the distance between the injection hole D1, D2, D3, D4 and the heating surface 51a are set such that the sprayed region A1, A2, A3, A4 is within the heating surface 51a.

A temperature sensor 31 that detects a temperature inside the vaporizing chamber 30b is attached to the reaction container 30. Specifically, the temperature sensor 31 is arranged above the heating surface 51a of the heater 50 within the vaporizing chamber 30b. Further, the temperature sensor 31 is positioned in a downstream side of the vaporizing chamber 30b with respect to the sprayed fuel in an air flow direction such that the fuel is not directly sprayed onto the temperature sensor 31. A temperature detected by the temperature sensor 31 is a temperature of the vaporized fuel after the vaporized fuel was reacted with air. The temperature sensor 31 outputs information of the detected temperature to the ECU 80.

When the electric power is supplied to the discharging reactor 20, electrons emitted from the electrodes 21 collide with oxygen molecules contained in air in the discharging passages 21a. As a result, ozone is generated from the oxygen molecules. That is, the discharging reactor 20 brings the oxygen molecules into a plasma state through a discharging process, thereby generating ozone as active oxygen. Then, the ozone generated by the discharging reactor 20 is contained in air that flows into the reaction container 30 through the air inlet 30c.

A cool flame reaction occurs inside the vaporizing chamber 30b. In the cool flam reaction, fuel in gas form is partially oxidized with oxygen or ozone in air. The fuel partially oxidized is called "reformed fuel", and partial oxide (for example, aldehyde) may be one example of the reformed fuel in which a portion of the fuel (hydrocarbon compound) is oxidized with an aldehyde group (CHO).

Next, the cool flame reaction will be described in detail with reference to FIGS. 5 to 7.

Figure 5:
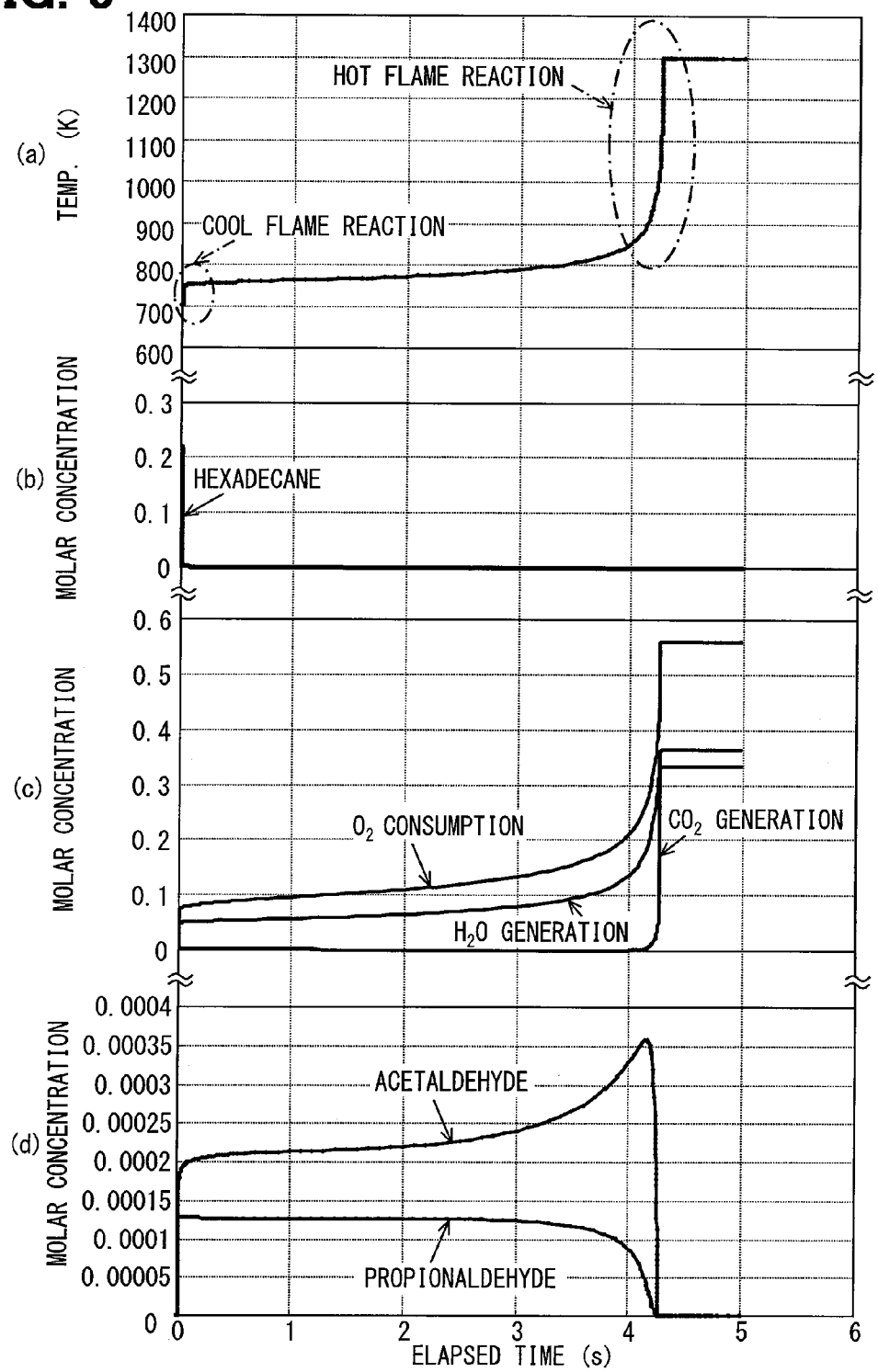
FIG. 5 is graphs related to a two-step oxidation reaction of a cool flame reaction and a hot flame reaction.
Figure 6:
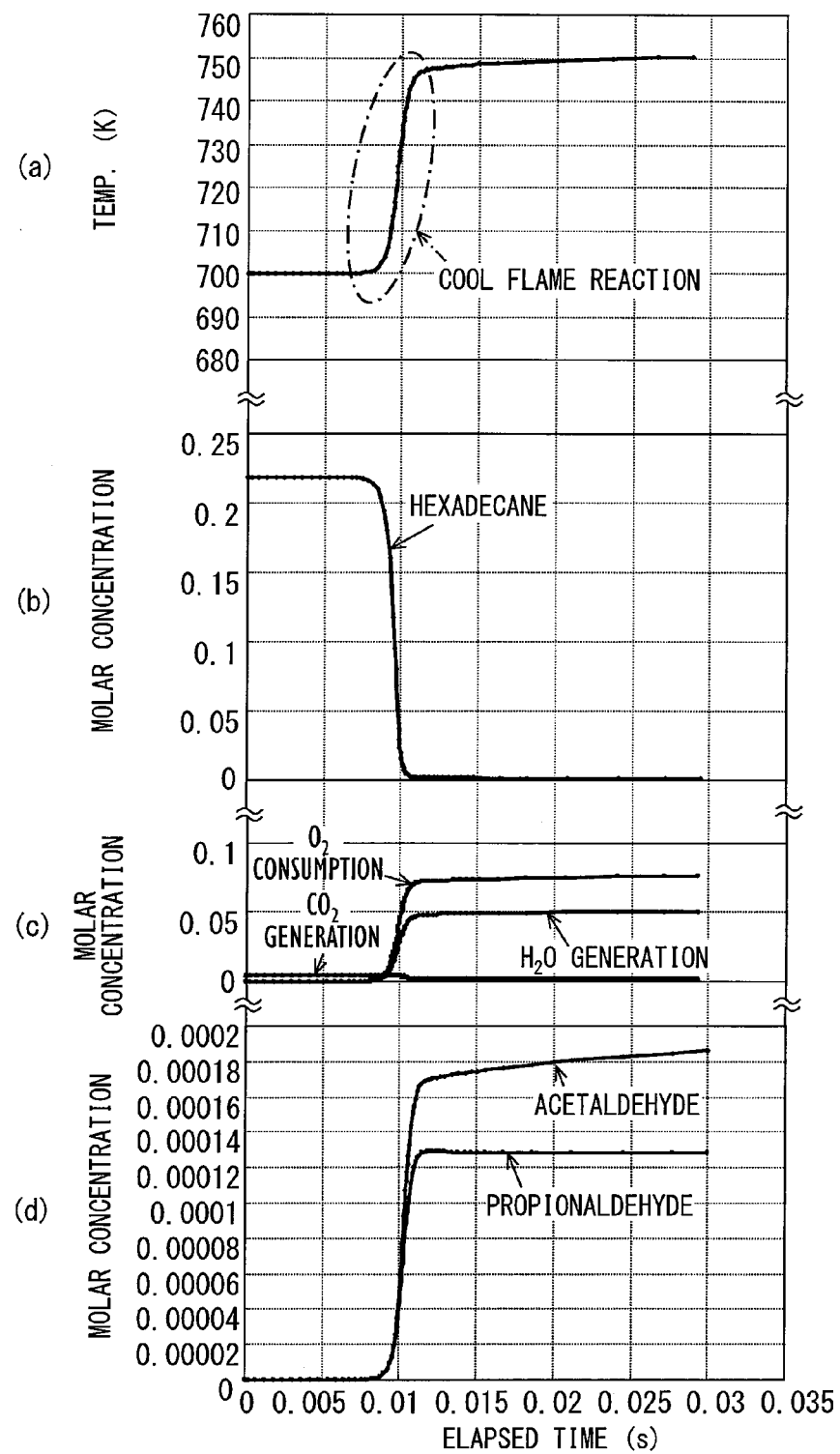
FIG. 6 is graphs illustrating portions of FIG. 5 corresponding to the cool flame reaction.

FIGS. 5 and 6 illustrate simulation results showing a phenomenon where fuel (hexadecane) is sprayed onto the heater 50 and is vaporized, and the vaporized fuel staying around the heater 50 is reformed. Specifically, each graph shows, in a case where the vaporized fuel (hexadecane) is exposed to an environment at 430° C., changes of a variety of physical quantities with respect to an elapsed time after the exposure. In FIGS. 5 and 6, a graph (a) illustrates a change in an ambient temperature, a graph (b) illustrates a change in a molar concentration of the fuel, a graph (c) illustrates changes in a molar concentration of (i) oxygen consumed through the oxidation process, (ii) water molecules generated through the oxidation process and (iii) carbon dioxide molecules generated through the oxidation process, and a graph (d) illustrates changes in a molar concentration of acetaldehyde and propionaldehyde, each of which is a reformed fuel generated through the cool flame reaction. Initial conditions at the start of the fuel injection are set with 1 atmospheric pressure, 2200 ppm of hexadecane concentration, 20% of oxygen concentration, 9% of carbon dioxide concentration and 2% of water concentration.

As shown in FIGS. 5 and 6, the ambient temperature increases, the molar concentration of the fuel decreases, and the molar concentration of the reformed fuel increased, immediately after injecting the fuel. This means that fuel generates heat by being oxidized with oxygen and that the reformed fuel is generated from the fuel, i.e., the cool flame reaction occurs. However, such a temperature increase and changes in molar concentration are temporary, and the temperature increase and the changes in the molar concentration do not appear until about 4 seconds elapse from the start of the fuel injection.

As shown in FIG. 5, when about 4 seconds elapse, the ambient temperature further increases, the molar concentration of the reformed fuel decreases, generation amounts of carbon dioxide and water increase, and a consumption amount of oxygen increases. This means that the reformed fuel generates heat by being oxidized with oxygen and that the reformed fuel completely burns to generate carbon dioxide and water, i.e., the hot flame reaction occurs. A temperature increase amount through the cool flame reaction is less than that through the hot flame reaction. Further, an oxygen consumption amount through the cool flame reaction is less than that through the hot flame reaction.

As shown in FIG. 5, when the oxidation reaction occurs through two steps, the reformed fuel is generated as a reaction intermediate during a period from the cool flame reaction to the hot flame reaction. Examples of the reaction intermediate may be a variety of hydrocarbon compounds, such as aldehyde, ketone, or the like. FIG. 7 illustrates an example of a main reaction path through which aldehyde is generated.

Figure 7:
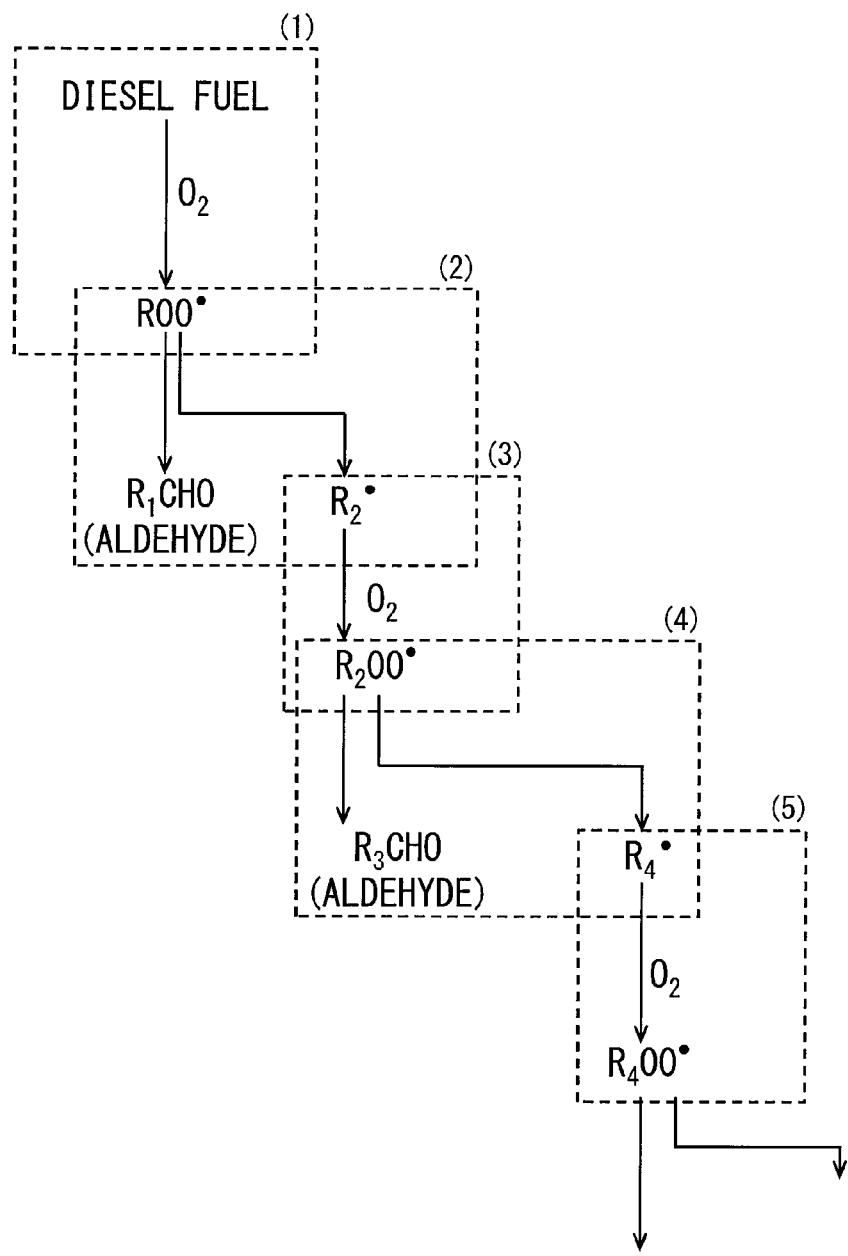
FIG. 7 is a diagram illustrating reaction process of the cool flame reaction.

As indicated by (1) in FIG. 7, hydrocarbon (diesel fuel) reacts with oxygen molecule and hydrocarbon peroxyl radical is generated. The hydrocarbon peroxyl radical is decomposed into aldehyde and hydrocarbon radical (refer to (2) in FIG. 7). The hydrocarbon radical reacts with an oxygen molecule and another hydrocarbon peroxyl radical is generated (refer to (3) in FIG. 7). The hydrocarbon peroxyl radical is decomposed into aldehyde and hydrocarbon radical (refer to (4) in FIG. 7). The hydrocarbon radical reacts with an oxygen molecule and also another hydrocarbon peroxyl radical is generated (refer to (5) in FIG. 7). In this way, hydrocarbon peroxyl radical is repeatedly generated while reducing the carbon number, and aldehyde is generated each time the hydrocarbon peroxyl radical is generated. It should be noted that, in the hot flame reaction, fuel is completely combusted and carbon dioxide and water are generated, and thus the reaction intermediate is not generated. In other words, the reaction intermediate generated through the cool flame reaction is oxidized into carbon dioxide and water during the hot flame reaction.

The inventors of the present disclosure had further carried out following experiments to confirm the probability of the simulation results shown in FIGS. 5 and 6. In the experiments, the fuel injector 40 sprayed diesel fuel, and the sprayed diesel fuel was brought into collision against a heated plate (not shown) at 500° C. Then, gas components vaporized on the heated plate were analyzed. As a result of the analysis, it was confirmed that acetaldehyde of about 30 ppm was generated when diesel fuel of 2000 ppm was brought into collision with the heated plate. The analysis result indicates that acetaldehyde can be generated through the cool flame reaction.

Figure 8:
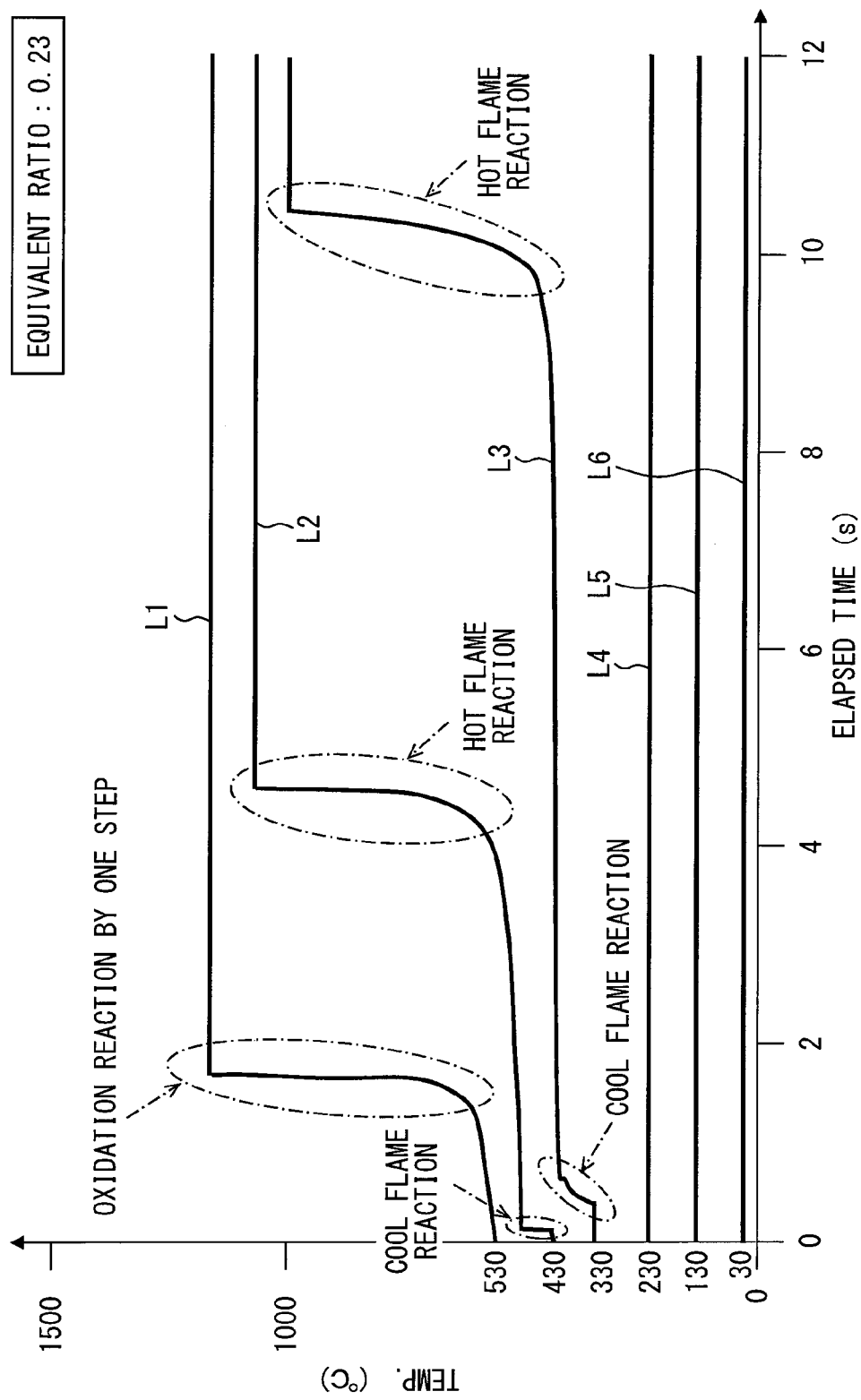
FIG. 8 is a graph illustrating results of simulating temperature changes caused by the two-step oxidation reaction under different conditions of an initial temperature.

In the simulation as shown in FIGS. 5 and 6, an exposure temperature for fuel was set to 430° C. The inventors of the present disclosure further had performed simulation with different the exposure temperatures, and analysis results as shown in FIG. 8 were obtained. In FIG. 8, symbols L1, L2, L3, L4, L5, and L6 show results when the exposure temperature is set to 530° C., 430° C., 330° C., 230° C., 130° C., and 30° C., respectively.

As indicated by the symbol L1, when the exposure temperature is 530° C., there is almost no period to stay in the cool flame reaction, and the oxidation reaction is completed with only one step. On the contrary, when the exposure temperature is set to 330° C. as indicated by the symbol L3, a start timing of the cool flame reaction is delayed as compared with a case where the exposure temperature is set to 430° C. as indicated by the symbol L2. Also, when the exposure temperature is set to 230° C. or lower, as indicated by the symbols L4 to L6, none of the cool flame reaction and the hot flame reaction occurs, i.e., the oxidation reaction does not occur.

Figure 9:
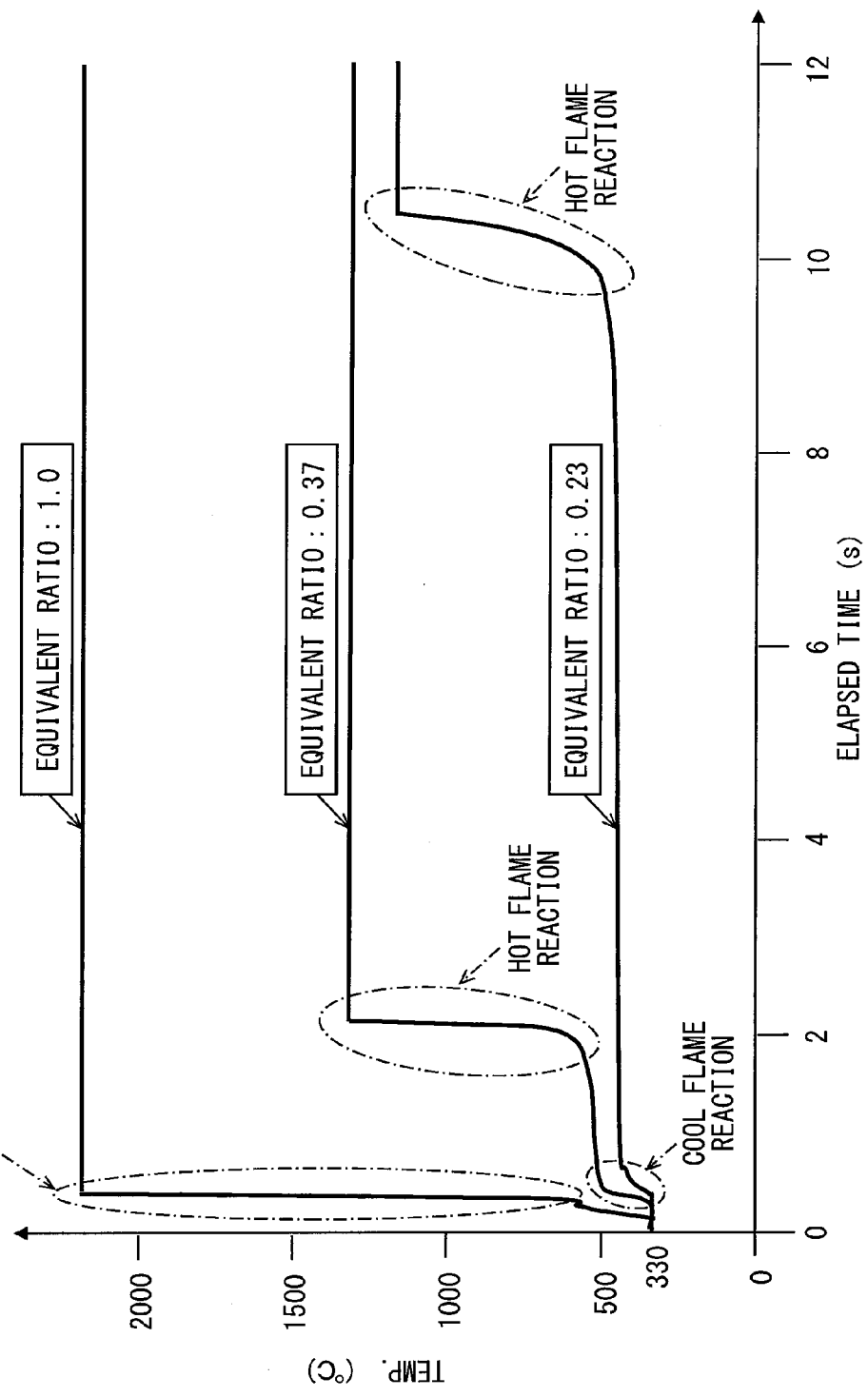
FIG. 9 is a graph illustrating results of simulating temperature changes caused by the two-step oxidation reaction under different conditions of an equivalence ratio.

In the simulation illustrated in FIG. 8, the equivalent ratio, which is a weight ratio of injected fuel to supplied air, is set to 0.23. In this connection, the present inventors have obtained results illustrated in FIG. 9 of the simulation with the different equivalent ratios. It should be noted that the equivalent ratio may be defined as a value by dividing "weight of fuel contained in an air-fuel mixture" by "weight of fuel that can be completely burned". As illustrated in FIG. 9, when the equivalent ratio is set to 1.0, there is almost no period to stay in the cool flame reaction, and the oxidation reaction is completed with only one step. Also, when the equivalent ratio is set to 0.37, the start timing of the cool flame reaction is advanced, a cool flame reaction rate increases, a cool flame reaction period decreases, and the ambient temperature at the time of completing the cool flame reaction increases, as compared with a case in which the equivalent ratio is set to 0.23.

Figure 10:
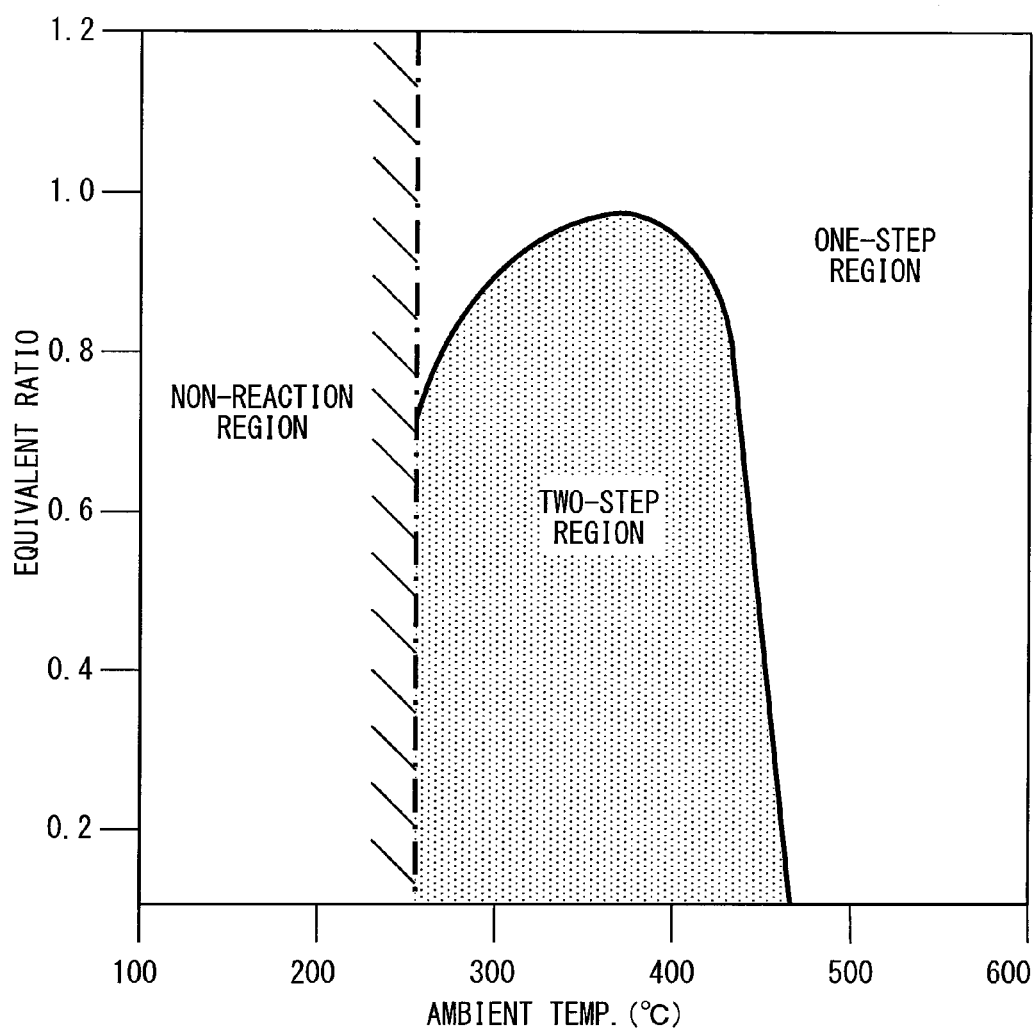
FIG. 10 is a graph illustrating a region of the initial temperature and the equivalent ratio in which the two-step oxidation reaction occurs.

FIG. 10 illustrates a summary of the analysis results of FIGS. 8 and 9, and the abscissa of the graph indicates the heater temperature (the ambient temperature) of FIG. 8 and the ordinate of the graph indicates the equivalent ratio of FIG. 9. The doted region in FIG. 10 is a region in which a two-step oxidation reaction occurs. As shown in FIG. 10, a region in which the ambient temperature is lower than a lower limit value is a non-reaction region in which the oxidation reaction does not occur. Further, even when the ambient temperature is higher than the lower limit value, a region in which the equivalent ratio is equal to or greater than 1.0 is a one-step oxidation reaction region in which the oxidation is completed with only one step.

A boundary line between the two-step oxidation reaction region and the one-step oxidation reaction region is changed according to the ambient temperature and the equivalent ratio. That is, when the ambient temperature falls within a specified temperature range and the equivalent ratio falls within a specified equivalent ratio range, the two-step oxidation reaction occurs. That is, the specified temperature range and the specified equivalent ratio range correspond to the doted region in FIG. 10. When the ambient temperature is set to an optimum temperature (e.g., 370° C.) within the specified temperature range, the equivalent ratio on the boundary line has a maximum value (e.g., 1.0). Thus, in order to generate the cool flame reaction earlier, the heater temperature is adjusted to the optimum temperature and the equivalent ratio is set to 1.0. However, when the equivalent ratio is greater than 1.0, the cool flame reaction does not occur, and thus the equivalent ratio is preferably set to a value less than 1.0 by a given margin.

Figure 11:
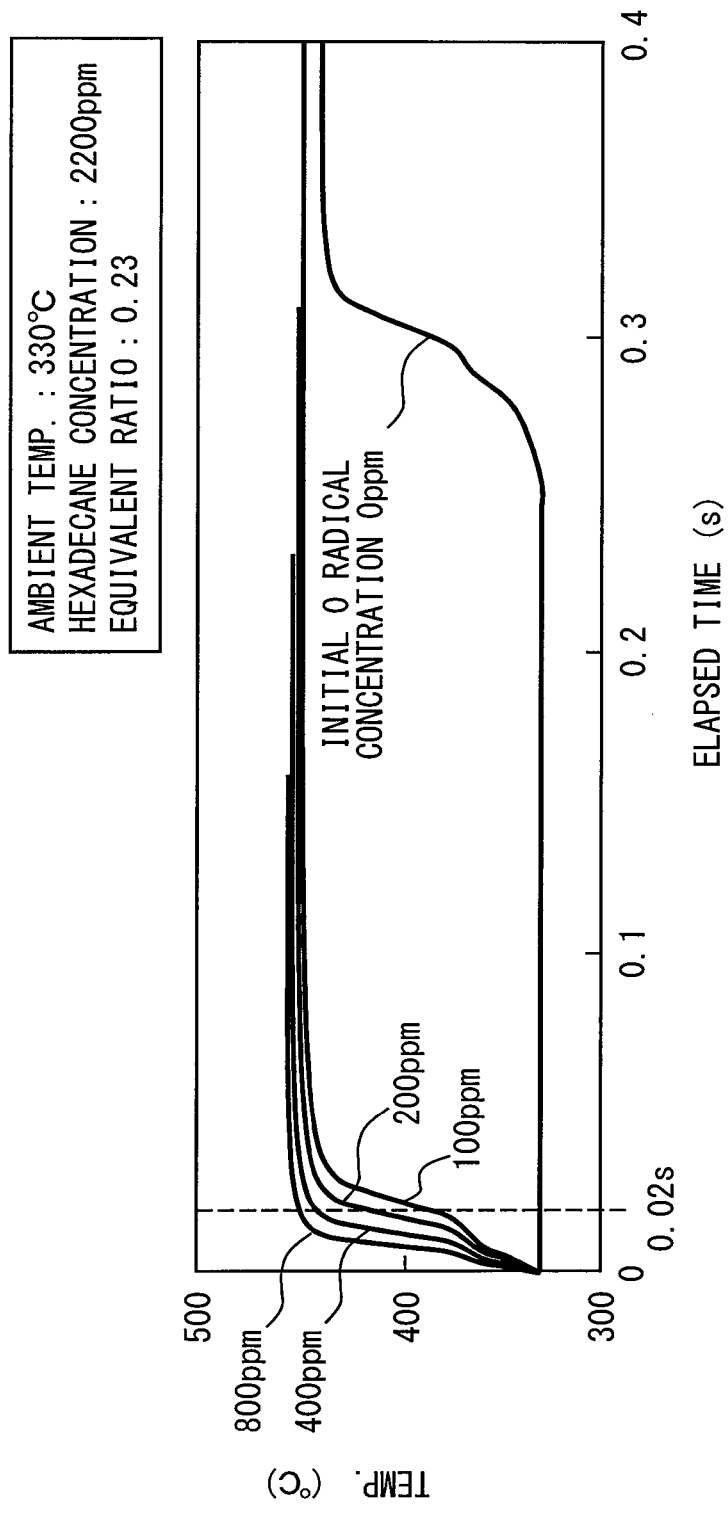
FIG. 11 is a graph illustrating results of simulating temperature changes caused by the two-step oxidation reaction under different conditions of an ozone concentration.

In the simulation as shown in FIGS. 8 and 9, an ozone concentration in air is set to zero. The inventors of the present disclosure had further performed simulation with different ozone concentrations in air, and an analysis result as shown in FIG. 11 was obtained. In the simulation, an initial condition was set with 1 atmospheric pressure, a hexadecane concentration of 2200 ppm, and the ambient temperature of 330° C. As shown in FIG. 11, the start timing of the cool flame reaction becomes earlier as the ozone concentration increases. Such a phenomenon can be explained as below. As described above, hydrocarbon radical reacts with oxygen molecule in (1), (3) and (5) in FIG. 7, and these reaction are accelerated with ozone contained in air. As a result, aldehyde is generated in a short time, whereby the start timing of the cool flame reaction becomes early.

The microcomputer 81 of the ECU 80 includes a memory unit to store programs, and a central processing unit executing an arithmetic processing according to the programs stored in the memory unit. The ECU 80 controls the operation of the internal combustion engine 10 based on detection values of sensors. The sensors may include an accelerator pedal sensor 91, an engine speed sensor 92, a throttle opening sensor 93, an intake air pressure sensor 94, an intake amount sensor 95, an exhaust temperature sensor 96, or the like.

The accelerator pedal sensor 91 detects a depressing amount of an accelerator pedal of a vehicle by a driver. The engine speed sensor 92 detects a rotational speed of an output shaft 10a of the internal combustion engine 10 (i.e., an engine rotational speed). The throttle opening sensor 93 detects an opening amount of the throttle valve 13. The intake air pressure sensor 94 detects a pressure of the intake passage 10in at a position downstream of the throttle valve 13. The intake amount sensor 95 detects the mass flow rate of intake air.

Figure 12:
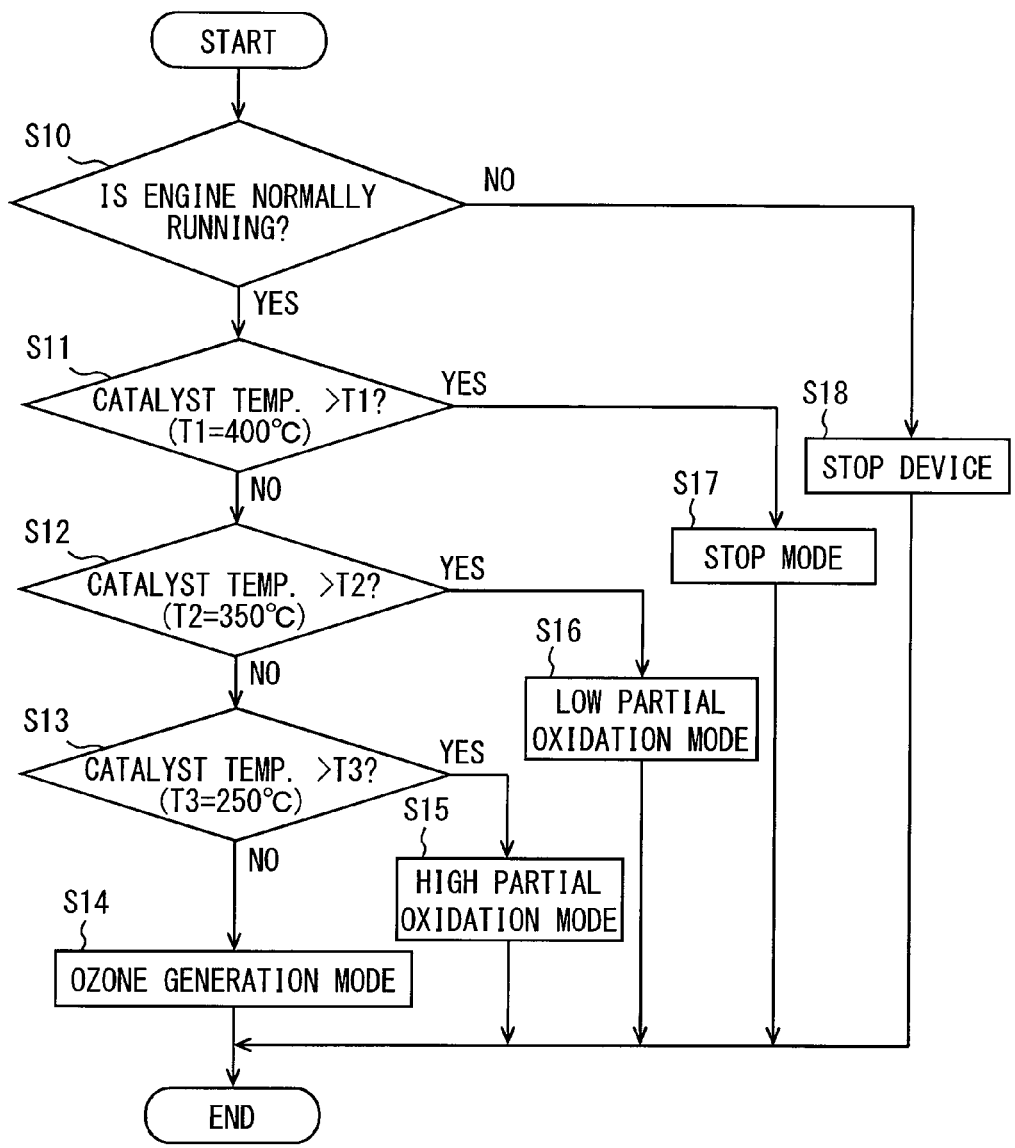
FIG. 12 is a flowchart illustrating a process to switch operation modes of the reducing agent supplying device illustrated in FIG. 1.

The ECU 80 generally controls an amount and injection timing of fuel for combustion that is injected from a fuel injection valve (not shown) according to a rotational speed of the output shaft 10a and an engine load of the internal combustion engine 10. Further, the ECU 80 controls the operation of the reducing agent supplying device based on an exhaust temperature detected by the exhaust temperature sensor 96. In other words, the microcomputer 81 switches between the generation of the reformed fuel and the generation of the ozone by repeatedly executing a process (i.e., a program) as shown in FIG. 12 at a predetermined period. The process starts when an ignition switch is turned on and is constantly executed while the internal combustion engine 10 is running.

At Step 10 of FIG. 12, the microcomputer 81 determines whether the internal combustion engine 10 is running. When the internal combustion engine 10 is not running, the operation of the reducing agent supplying device is stopped at Step 18. More specifically, when electric power has been supplied to the discharging reactor 20, the air pump 20p, the fuel injector 40 and the heater 50, the electric power supply is stopped. In addition, when a temperature of the reducing catalyst (NOx catalyst temperature) is lower than the activation temperature and an amount of NOx adsorbed in the reducing catalyst (NOx adsorbed amount) is saturated, or when the NOx catalyst temperature is at a high temperature exceeding a reduction possible temperature range, the device is also stopped at Step 18.

When it is determined that the internal combustion engine 10 is running, the reducing agent supplying device is operated according to the NOx catalyst temperature in the NOx purifying device 15. Specifically, at Step 11, it is determined whether the NOx catalyst temperature is higher than a first specified temperature T1. When the NOx catalyst temperature is lower than the first specified temperature T1, it is determined whether the NOx catalyst temperature is higher than a second specified temperature T2 at Step 12. When the NOx catalyst temperature is lower than the second specified temperature T2, it is determined whether the NOx catalyst temperature is higher than an activation temperature T3 of the reducing catalyst at Step 13.

The first specified temperature T1 and the second specified temperature T2 are set to be higher than the activation temperature T3, and the first specified temperature T1 is set to be higher than the second specified temperature T2. For example, when the activation temperature T3 is 250° C., the first and second specified temperatures are set to 400° C. and 350° C., respectively. The NOx catalyst temperature is estimated from an exhaust temperature detected by the exhaust temperature sensor 96. It should be noted that the activation temperature T3 of the reducing catalyst is a minimum temperature at which NOx can be reduced and purified in the existence of the reducing catalyst.

When it is determined that the NOx catalyst temperature is lower than the activation temperature T3 through Steps 11, 12 and 13, the reducing agent supplying device is operated in an ozone generation mode at Step 14. When it is determined that the NOx catalyst temperature is higher than the activation temperature T3 and lower than the second specified temperature T2, the reducing agent supplying device is operated in a high partial oxidation mode at Step 15. Whereas, it is determined that the NOx catalyst temperature is higher than the second specified temperature T2 and lower than the first specified temperature T1, the reducing agent supplying device is operated in a low partial oxidation mode at Step 16. Furthermore, it is determined that the NOx catalyst temperature is higher than the first specified temperature T1, the reducing agent supplying device is stopped in a stop mode at Step 17.

Figure 13:
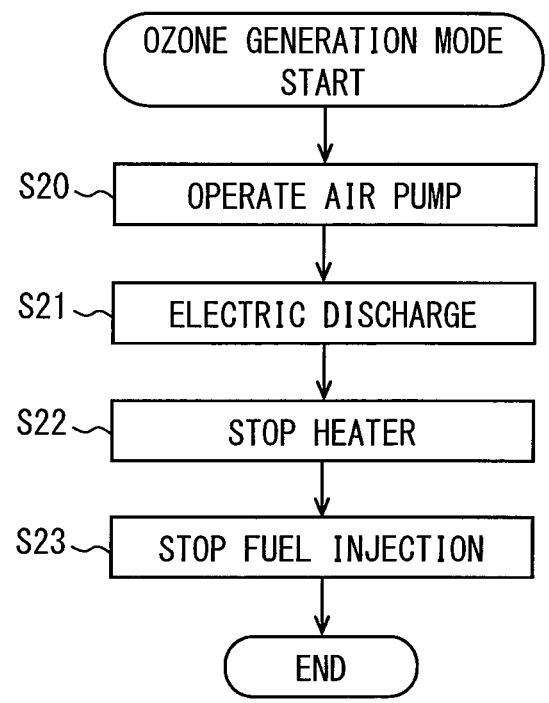
FIG. 13 is a flowchart illustrating a process of a subroutine of an ozone generation mode illustrated in FIG. 12.

When the ozone generation mode is set at Step 14, the subroutine process of FIG. 13 will starts. Initially, the air pump 20p is operated with a predetermined power amount at Step 20. Then, at Step 21, a predetermined power amount is supplied to the electrodes 21 of the discharging reactor 20 to start electric discharge. Next, power supply to the heater 50 is stopped at Step 22, and power supply to the fuel injector 40 is stopped to stop fuel injection at Step 23.

According to the ozone generation mode, the discharging reactor 20 generates ozone and the generated ozone is supplied into the exhaust passage 10ex through the fuel injection chamber 30a, the vaporizing chamber 30b and the supply passage 32. In this case, if power supply to the heater 50 is implemented, the ozone would be heated by the heater 50 and then would collapse. Also, if fuel is supplied, the ozone inside the discharging reactor 20 would react with the supplied fuel. In view of this, in the ozone generation mode as shown in FIG. 13, heating by the heater 50 and the fuel supply by the fuel injector 40 are stopped. For that reason, since both the reaction of the ozone with the fuel and the heating collapse of the ozone can be avoided, the generated ozone is supplied into the exhaust passage 10ex as it is.

Figure 14:
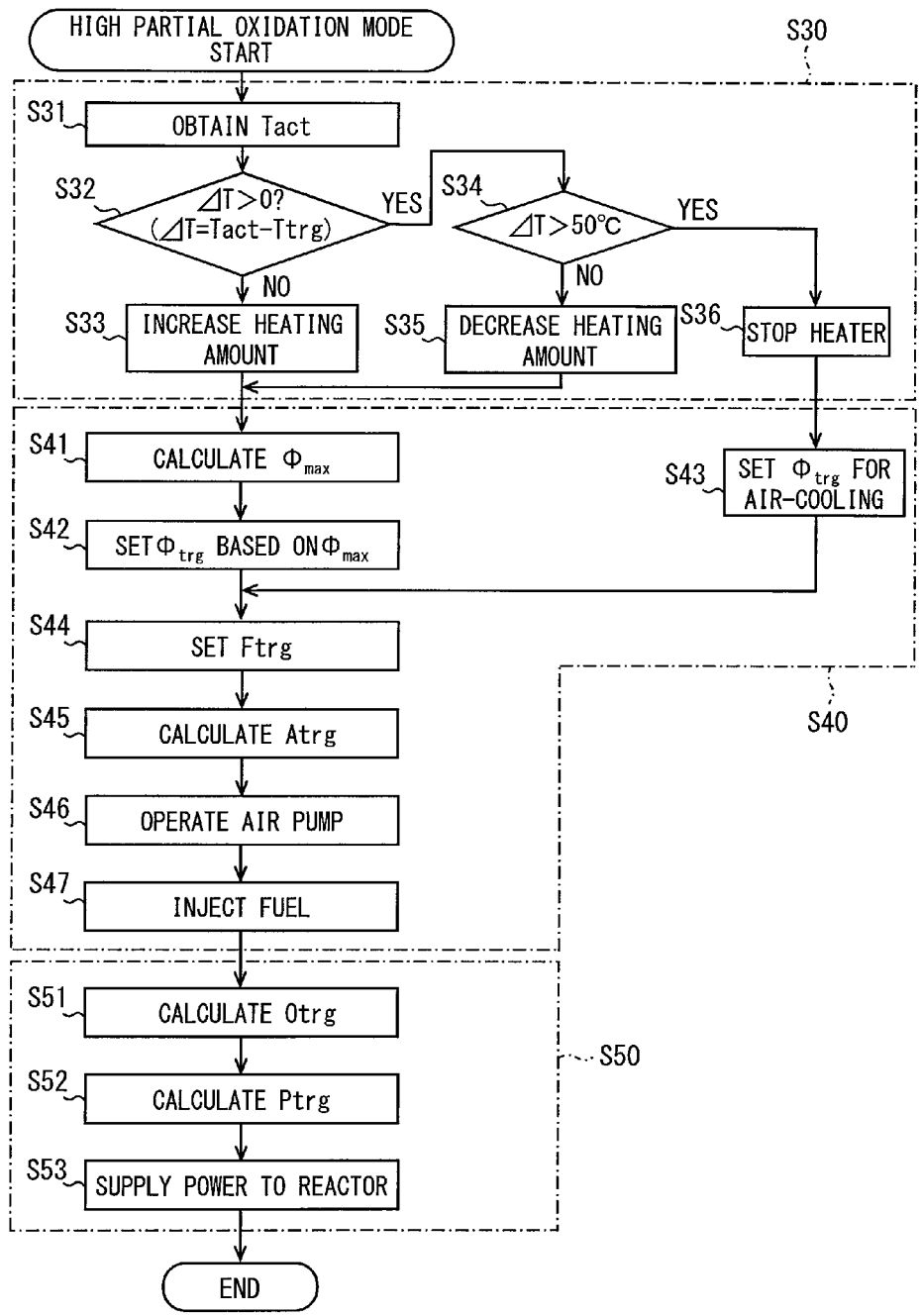
FIG. 14 is a flowchart illustrating a process of a subroutine of a high partial oxidation mode illustrated in FIG. 12.

When the high partial oxidation mode is set at Step 15 of FIG. 12, the subroutine process of FIG. 14 will start.

An outline of the process in FIG. 14 will be described according to dashed lines in the figure. At Step 30, the operation of the heater 50 is controlled to adjust a temperature inside the reaction container 30 within the specified temperature range. Then, at Step 40, the equivalent ratio that is a ratio of fuel to air inside the reaction container 30 is adjusted to a value within the specified equivalent ratio range. The specified temperature range and the specified equivalent ratio range are included inside the two-step oxidation region indicated by the doted region in FIG. 10. Accordingly, the cool flame reaction occurs and the reformed fuel as described above is generated.

The lower limit of the specified temperature range is set to 260° C. that is the boundary line between the one-step oxidation region and the non-reaction region and between the two-step oxidation region and the non-reaction region. The upper limit of the specified temperature range is set to the maximum temperature in a boundary line between the one-step oxidation region and the two-step oxidation region. The upper limit of the specified equivalent ratio range is set to a value that is a maximum value in the boundary line between the one-step oxidation region and the two-step oxidation region and that corresponds to 370° C.

Further, at Step 50, the power supply to the discharging reactor 20 is controlled according to a concentration of fuel within the reaction container 30. Accordingly, ozone is generated, and the generated ozone is supplied into the reaction container 30. Thus, as described above with reference to FIG. 11, the start timing of the cool flame reaction is advanced, and the cool flame reaction time is reduced. Hence, even when the reaction container 30 is downsized so that a staying time of fuel within the reaction container 30 is decreased, the cool flame reaction can be completed within the staying time, whereby the reaction container 30 can be downsized.

The discharging reactor 20 and the air pump 20p may serve as "ozone supplier" that supplies ozone into vaporized fuel as a reducing agent and reforms the reducing agent under an ozone-present atmosphere. The microcomputer 81 executing Step 30 may serve as "temperature adjusting portion" that adjusts a temperature inside the vaporizing chamber 30b to be a specified temperature range. The microcomputer 81 executing Step 40 may serve as "equivalent ratio controller" that adjusts an equivalent ratio of fuel and air, which are supplied into the vaporizing chamber 30b, to be within a specified equivalent ratio range. The microcomputer 81 executing Step 50 may serve as "ozone controller" that controls the ozone supplier to supply ozone when a temperature of the reducing catalyst is lower than the second specified temperature T2.

Next, the process at Step 30, 40, 50 will be further described in detail with reference to FIG. 14.

First, the process of the temperature controller at Step 30 will be described. At Step 31, a temperature inside the reducing agent supplying device, i.e., inside the reaction container 30, is obtained. Specifically, a detection temperature Tact detected by the temperature sensor 31 is obtained. At subsequent Step 32, it is determined whether the detection temperature Tact is higher than a predetermined target temperature Ttrg. More specifically, it is determined whether a difference $\Delta t$ obtained by subtracting the target temperature Ttrg from the detection temperature Tact is greater than zero.

When $\Delta T>0$ is not satisfied, the process proceeds to Step 33, and a heating amount by the heater 50 is increased. Specifically, an energizing duty ratio to the heater 50 is increased as the absolute value of the difference $\Delta t$ increases. Whereas, when $\Delta T>0$ is satisfied, it is determined whether the difference $\Delta T$ exceeds a maximum value (e.g., 50° C.) at Step 34. When the difference ΔT does not exceed the maximum value, the process proceeds to Step 35, and a heating amount by the heater 50 is decreased. Specifically, the energizing duty ratio to the heater 50 is decreased as the absolute value of the difference Δt increases. However, when the difference ΔT exceeds the maximum value, the process proceeds to Step 36, and the electric supply to the heater 50 is stopped. Therefore, the ambient temperature can be rapidly decreased.

The target temperature Ttrg used at Step 32 is set to the ambient temperature (e.g., 370° C.) at which the equivalent ratio has the maximum value in the two-step oxidation region shown in FIG. 10. Since a temperature inside the vaporizing chamber 30b is increased by the cool flame reaction, the heater 50 is controlled to have a temperature that is lower than the target temperature Ttrg by a temperature increase by the cool flame reaction.

Next, a process by the equivalent ratio controller at Step 40 will be described below. At Step 40, when the difference Δt is equal to or less than 50° C., the process proceeds to Step 41, and a maximum value φmax of the equivalent ratio, which corresponds to the detection temperature Tact, and at which the cool flame reaction occurs, is calculated. More specifically, the maximum value φmax of the equivalent ratio corresponding to the ambient temperature in the two-step oxidation region, or a value obtained by subtracting a given margin from the maximum value φmax is stored in the microcomputer 81 as a target equivalent ratio φtrg. For example, a map for the maximum value φmax of the equivalent ratio corresponding to the ambient temperature in the two-step oxidation region is prepared and the map is stored in the microcomputer 81 in advance. Then, the maximum value φmax of the equivalent ratio corresponding to the detection temperature Tact is calculated using the map.

At Step 42, the target equivalent ratio φtrg is set based on the maximum value φmax of the equivalent ratio calculated at Step 41. More specifically, the target equivalent ratio φtrg is set by subtracting a given margin from the maximum value φmax. Accordingly, even when an actual equivalent ratio is greater than the target equivalent ratio φtrg, the actual equivalent ratio less likely exceeds the maximum value φmax, and thus the likelihood of nonoccurrence of the cool flame reaction can be decreased.

Whereas, when the difference Δt is greater than 50° C. and the heater 50 is stopped at Step 36, the process proceeds to Step 43, and the target equivalent ratio φtrg is set to a predetermined value for air-cooling. The predetermined value for air-cooling is set to be greater than the maximum value φmax of the equivalent ratio corresponding to the target temperature Ttrg. In other words, a decrease in the ambient temperature can be accelerated by increasing a flow amount of air compared to the case of Step 42.

At Step 44, a target fuel flow rate Ftrg is set. The target fuel flow rate Ftrg is a flow rate of fuel to appropriately supply a necessary fuel amount in order to fully reduce NOx that flows into the NOx purifying device 15. The target fuel flow rate Ftrg means the mass of fuel that is supplied into the NOx purifying device 15 per unit time.

Specifically, the target fuel flow rate Ftrg is set based on an NOx inflow rate that will be described below, and the NOx catalyst temperature. The NOx inflow rate is the mass of NOx that flows into the NOx purifying device 15 per unit time. For example, the NOx inflow rate can be estimated based on an operating condition of the internal combustion engine 10. The NOx catalyst temperature is a temperature of the reducing catalyst inside the NOx purifying device 15. For example, the NOx catalyst temperature can be estimated based on a temperature detected by the exhaust temperature sensor 96.

The target fuel flow rate Ftrg increases as the NOx inflow rate increases. Also, since a reduced amount (reducing performance) of NOx in the presence of the reducing catalyst changes according to the NOx catalyst temperature, the target fuel flow rate Ftrg is set according to a difference in the reducing performance due to the NOx catalyst temperature.

At subsequent Step 45, a target air flow rate Atrg is calculated based on the target equivalent ratio φtrg set at Step 42 or Step 43, and the target fuel flow rate Ftrg set at Step 44. Specifically, the target air flow rate Atrg is so calculated as to meet φtrg=Ftrg/Atrg.

In subsequent Step 46, the operation of the air pump 20p is controlled based on the target air flow rate Atrg calculated at Step 45. Specifically, the energizing duty ratio to the air pump 20p increases as the target air flow rate Atrg increases. Next, at Step 47, the operation of the fuel injector 40 is controlled to execute fuel injection based on the target fuel flow rate Ftrg set at Step 44. Specifically, the opening time of the fuel injector 40 is increased as the target fuel flow rate Ftrg increases.

Then, a description will be given of the process of Step 50 by the discharging power controller. Initially, a target ozone flow rate Otrg is calculated at Step 51 based on the target fuel flow rate Ftrg set at Step 44. Specifically, the target ozone flow rate Otrg is calculated so that a ratio of an ozone concentration to a fuel concentration inside the vaporizing chamber 30b becomes a given value (for example, 0.2). For example, the ratio is set so that the cool flame reaction can be completed within a given time (for example, 0.02 sec). For example, when the fuel concentration is 2200 ppm as shown in FIG. 11, the ozone concentration of 400 ppm is required to complete the cool flame reaction within 0.02 sec. In this case, the target ozone flow rate Otrg is set such that the ozone concentration becomes 400 ppm. Furthermore, at Step 51, the target ozone flow rate Otrg is set to be increased as the NOx catalyst temperature decreases.

In subsequent Step 52, a target energizing amount Ptrg to the discharging reactor 20 is calculated based on the target air flow rate Atrg calculated at Step 45 and the target ozone flow rate Otrg calculated at Step S51. The staying time of air inside the discharging passage 21a decreases as the target air flow rate Atrg increases. Therefore, the target energizing amount Ptrg is increased as the target air flow rate Atrg increases. Further, target energizing amount Ptrg is increased as the target ozone flow rate Otrg increases. Next, at Step 53, the energizing amount to the discharging reactor 20 is controlled based on the target energizing amount Ptrg calculated at Step 52. Specifically, the energizing duty ratio to the discharging reactor 20 increases as the target energizing amount Ptrg increases.

According to the high partial oxidation mode shown in FIG. 14, ozone generated at the discharging reactor 20, oxygen in air, and fuel vaporized by the heater 50 are mixed with each other inside the vaporizing chamber 30b and then the fuel is partially oxidized under the ozone-present environment. On the other hand, in the low partial oxidation mode shown in FIG. 15, the generation of ozone is stopped, and fuel vaporized by the heater 50 and oxygen in air are mixed with each other inside the vaporizing chamber 30b and then fuel is partially oxidized under a non-ozone-present environment.

Figure 15:
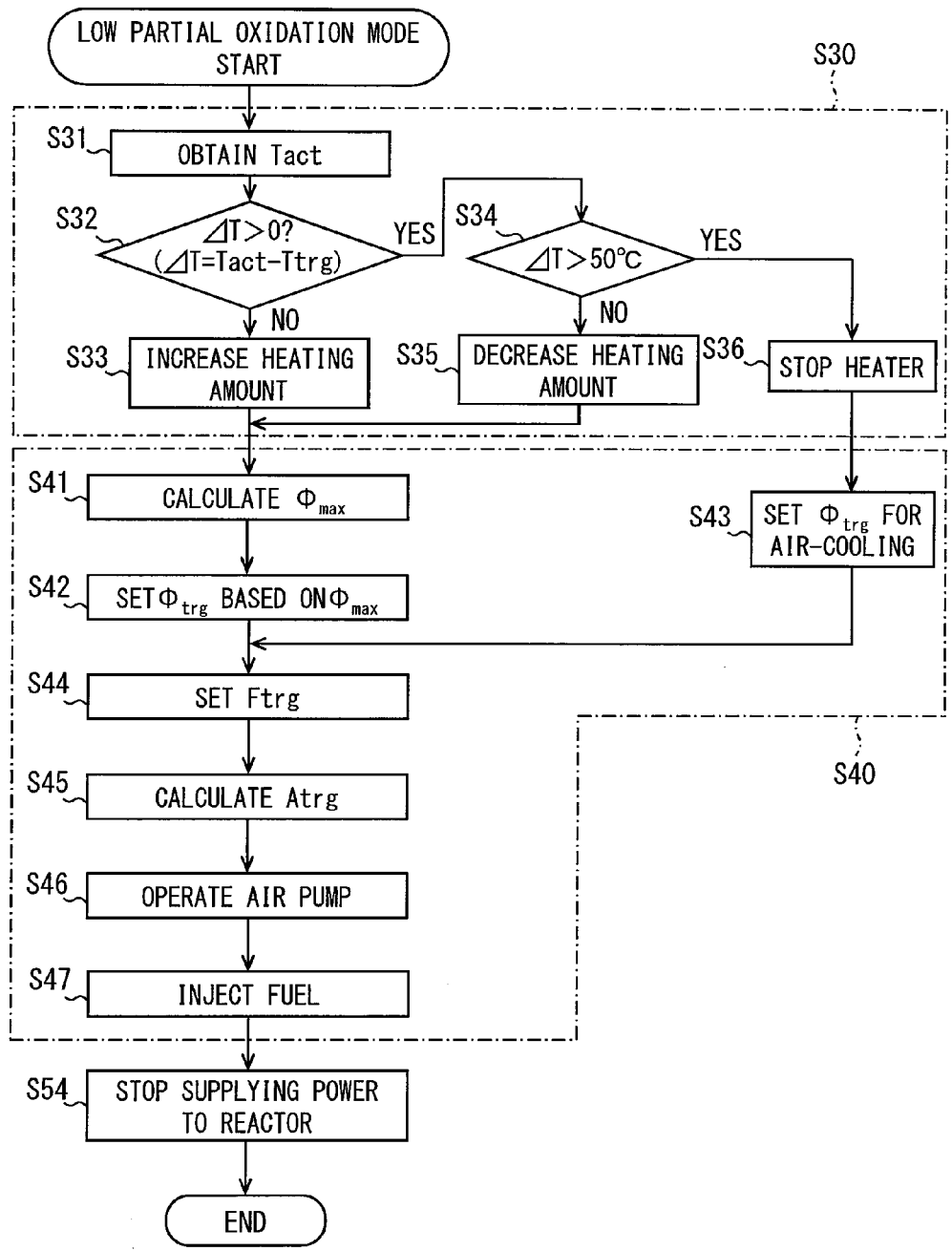
FIG. 15 is a flowchart illustrating a process of a subroutine of a low partial oxidation mode illustrated in FIG. 12.

More specifically, when the low partial oxidation mode is set at Step 16 of FIG. 12, the subroutine process of FIG. 15 will start. In the process of FIG. 15, while the process similar to Steps 30 and 40 shown in FIG. 14 is executed, the process at Step 50 of FIG. 14 is eliminated. In short, the ambient temperature is adjusted within the specified temperature range at Step 30 and the equivalent ratio is adjusted within the specified equivalent ratio range at Step 40. However, the ozone generation of Step 50 in FIG. 14 is not executed and power supply to the discharging reactor 20 is stopped at Step 54.

Figure 16:
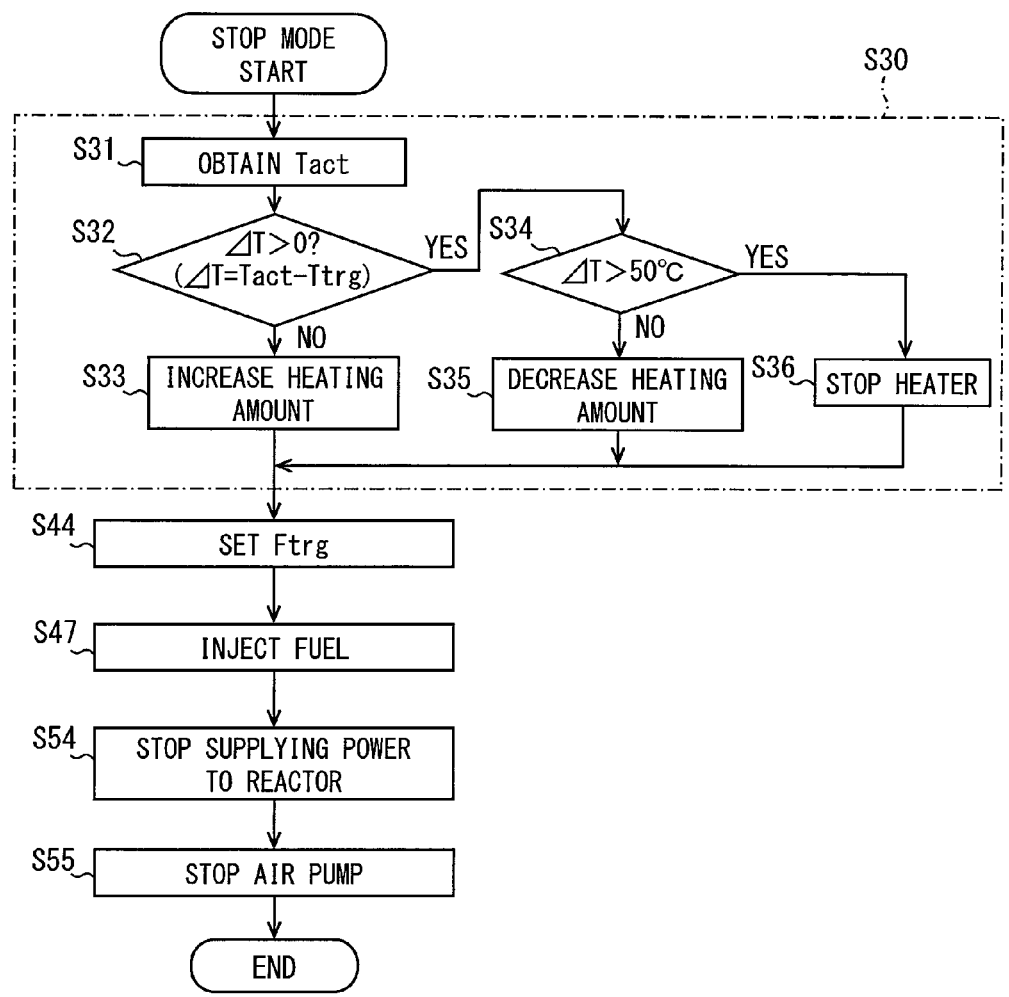
FIG. 16 is a flowchart illustrating a process of a subroutine of a stop mode illustrated in FIG. 12.

Whereas, when the stop mode is set at Step 17 of FIG. 12, the subroutine process shown in FIG. 16 will start. In the process of FIG. 16, while the process similar to Step 30 of FIG. 14 is executed, the processes at Steps 40 and 50 of FIG. 14 are eliminated. In short, the ambient temperature is adjusted to be within the specified temperature range at Step 30. However, the equivalent ratio adjustment at Step 40 and the ozone generation at Step 50 in FIG. 14 are not executed and power supply to the discharging reactor 20 is stopped at Step 54 and the operation of the air pump 20p is stopped at Step 55.

After the ambient temperature was adjusted at Step 30, the target fuel flow rate Ftrg is set at Step 44, as with the process in FIG. 14. Thereafter, the operation of the fuel injector 40 is controlled at Step 47 based on the target fuel flow rate Ftrg set at Step 44 and executes fuel injection.

That is, according to the stop mode shown in FIG. 16, while the ozone generation and the air (oxygen) supply to the vaporizing chamber 30b are stopped, the fuel supply to the vaporizing chamber 30b is executed to vaporize the supplied fuel. Thus, the vaporized fuel is supplied into the exhaust passage 10ex without being partially oxidized with the oxygen or the ozone. The microcomputer 81 executing Steps 54 and 55 may serve "reformation suppressing portion" that suppresses the degree of reformation of fuel or stops the reformation of the fuel.

Figure 17:
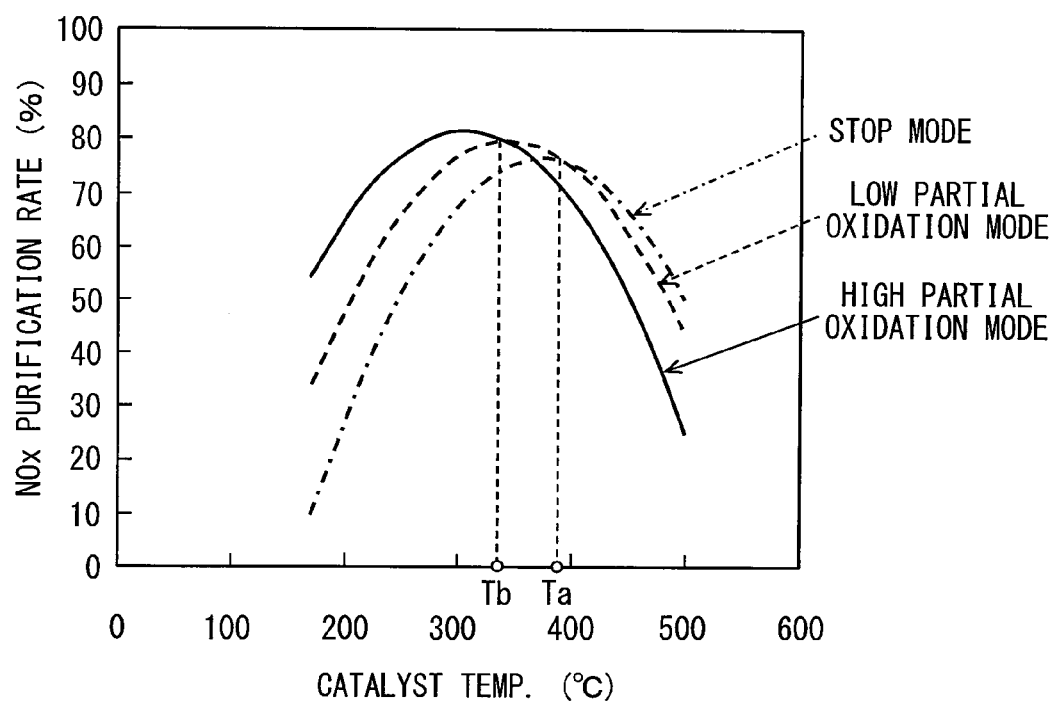
FIG. 17 is a graph illustrating relationships between the NOx purification rate and the catalyst temperature for each mode that is switched through the process of FIG. 12.

The NOx purification rate will change according to the NOx catalyst temperature when the reducing agent is supplied under either above-described mode. FIG. 17 shows a simulation result indicating the relationship between the NOx catalyst temperature and the NOx purification rate. The solid line, the dashed line and the dot-dash-line in FIG. 17 represent the high partial oxidation mode, the low partial oxidation mode and the stop mode. In the simulation, a silver/alumina catalyst is used as the reducing catalyst. Further, a hydrocarbon HC is used as the reducing agent, and the hydrocarbon HC at the concentration of 1000 ppmC as converted into the concentration of methane is supplied. Furthermore, the concentration of NOx flowing into the reducing catalyst is 60 ppm and the concentration of oxygen flowing into the reducing catalyst is 10%. The concentration of ozone during the high partial oxidation mode is 50 ppm.

As shown in FIG. 17, in all modes, there exists a catalyst temperature (peak temperature) at which the purification rate has a maximum value. However, the peak temperature of each mode has a different value. In short, the peak temperature for the high partial oxidation mode is lower than the peak temperature for the low partial oxidation mode, and the peak temperature for the low partial oxidation mode is lower than the peak temperature for the stop mode. The maximum value of the purification rate at the peak temperature for the high partial oxidation mode has the highest value, and then the maximum value of the purification rate for the low partial oxidation mode has the second highest value. The maximum value of the purification rate for the stop mode has the lowest value.

However, in a temperature range higher than a temperature indicated by Ta (first boundary temperature), the purification rate for the stop mode is higher than the purification rate for the low partial oxidation mode. Further, in a temperature range higher than a temperature indicated by Tb (second boundary temperature), the purification rate for the low partial oxidation mode is higher than the purification rate for the high partial oxidation mode. According to study by the inventors of the present disclosure, such a reversal phenomenon for the value of the purification rate can be explained as below.

In the temperature range higher than the first boundary temperature Ta, a portion of the reformed fuel that was partially oxidized is fully oxidized before reducing NOx, and is decomposed (oxidative deterioration) into carbon dioxide and water, thereby losing the capacity to reduce NOx. For this reason, the purification rate is rather increased in such a temperature range when the reformation by the partial oxidation is stopped. Similarly, in the temperature range higher than the second boundary temperature Tb, the reformed fuel loses the reducing capacity for NOx through the oxidative deterioration. The degree of the oxidative deterioration will increase as the catalyst temperature increases. Therefore, it can be also said that the purification rate is rather increased in such a temperature range when the reformation by the partial oxidation is stopped. On the contrary, at a temperature range lower than the second boundary temperature Tb, the above oxidative deterioration almost does not occur, even when the partial oxidation is accelerated by supplying ozone. Therefore, the purification rate can increase in the temperature range lower than the second boundary temperature Tb by supplying ozone.

Based on the above-described finding, the first specified temperature T1 used for deciding the mode in FIG. 12 is set based on the first boundary temperature Ta. Specifically, the first specified temperature T1 is set to the first boundary temperature Ta or a temperature within a specified range including the first boundary temperature Ta. Then, if the reducing catalyst temperature is higher than the first specified temperature T1, the operation mode is switched to the stop mode and the reformation of fuel is stopped. Thus, when, for example, the catalyst temperature rises from a temperature range lower than the first boundary temperature Ta to a temperature range higher than the first boundary temperature Ta, the operation mode is switched from the low partial oxidation mode to the stop mode. Therefore, it may be possible to suppress a situation where partially oxidized fuel is fully oxidized and loses the NOx reducing capacity. Hence, the purification rate can be improved.

Furthermore, the ozone supplier and the ozone controller are provided in the present embodiment. The ozone supplier supplies ozone to the reducing agent and reforms the reducing agent under the ozone-present environment. The ozone controller controls the ozone supplier to supply ozone when the reducing catalyst temperature is lower than the second specified temperature T2 that is set to be equal to or higher than the activation temperature and lower than the first specified temperature T1. Accordingly, when, for example, the catalyst temperature rises to a temperature range higher than the second specified temperature T2 from a temperature range lower than the second specified temperature T2, the operation mode is switched from the high partial oxidation mode to the low partial oxidation mode. Thus, it may be possible to suppress a situation where partially oxidized fuel is fully oxidized and loses the NOx reducing capacity. Therefore, the purification rate can be improved.

Furthermore, the ozone controller controls the ozone supplier to increase a supply amount of ozone as the catalyst temperature decreases during the high partial oxidation mode. The risk that fuel partially oxidized is fully oxidized and loses the NOx reducing capacity will decrease as the catalyst temperature decreases. Hence, according to the present embodiment where the supply amount of ozone is increased as the catalyst temperature decreases, the partial oxidation by ozone can be accelerated under such a condition where the above described risk is suppressed.

According to the present embodiment, the reforming portion includes the reaction chamber defining the reaction chamber therein, inside which the reducing agent is partially oxidized with oxygen, and the reformation suppressing portion stops the reformation of the reducing agent by discontinuing oxygen supply into the reaction chamber. Although, the reformation of the reducing agent can be achieved by decreasing a temperature inside the reaction chamber, it would take time to decrease the temperature inside the reaction chamber to a low temperature at which the reformation of the reducing agent stops. In contrast, the reformation is stopped by discontinuing the oxygen supply in the present embodiment, the reformation can be rapidly stopped.

In the present embodiment, the check valve 34, which is disposed in the connecting pipe 33 (air supply passage) through which air is supplied into the reaction chamber, is operated to close the air supply passage when the reformation suppressing portion stops the reformation. Accordingly, fuel vaporized in the reaction container 30 can be prevented from flowing back to the discharging reactor 20 during the stop mode.

Furthermore, since the check valve 34 is biased by the spring 34a in the present embodiment, the check valve 34 is operated to close when the air pump 20p is stopped, whereas the check valve 34 is operated to open when the air pump 20p is operated. Thus, the check valve 34 is opened by pressure difference generated by the air pump 20p during the high partial oxidation mode or the low partial oxidation mode, whereas the check valve 34 is closed by stopping the air pump 20p during the stop mode. As a result, the close operation of the check valve 34 during the stop mode can be achieved with such a simple structure.

According to the present embodiment, the reducing agent supplying device includes the reaction container 30 in which fuel is oxidized with oxygen in air. A temperature and the equivalent ratio within the reaction container 30 are adjusted to generate the cool flame reaction, and the fuel (reformed fuel) partially oxidized through the cool flame reaction is supplied into the exhaust passage 10ex as the NOx purifying reducing agent. Thus, the NOx purification rate can be improved as compared with a case in which fuel not partially oxidized is used as the reducing agent.

Further, in the present embodiment, the discharging reactor 20 is provided, and ozone generated by the discharging reactor 20 is supplied into the reaction container 30 when the cool flame reaction is generated. For that reason, the start timing of the cool flame reaction can be advanced, and the cool flame reaction time can be reduced (refer to FIG. 11). Hence, even when the reaction container 30 is downsized, and a staying time of the fuel within the reaction container 30 is shortened, the cool flame reaction can be completed within the staying time. Thus, the reaction container 30 can be downsized.

Further in the present embodiment, the electric power used for the electric discharge is controlled according to the concentration of fuel inside the vaporizing chamber 30b through the process of Step 50 in FIG. 14. For example, the target ozone flow rate Otrg is calculated so that a ratio of the ozone concentration to the fuel concentration becomes a given value (for example, 0.2), and then a discharging power is controlled. For that reason, the excess or deficiency of the ozone concentration with respect to the fuel concentration is suppressed, and the start of the cool flame reaction can be advanced by supplying the ozone at the appropriate amount, whereby the electric consumption at the discharging reactor 20 can be reduced.

Further, in the present embodiment, when a temperature of the reducing catalyst is lower than the activation temperature T3, ozone generated by the discharging reactor 20 is supplied into the vaporizing chamber 30b while stopping fuel injection by the fuel injector 40, thereby supplying the ozone into the exhaust passage 10ex. Accordingly, the reformed fuel as the reducing agent can be prevented from being supplied when the reducing catalyst in the NOx purifying device 15 is not activated. Since NO in the exhaust gas is oxidized into $NO_2$ by supplying ozone, and is adsorbed inside the NOx purification catalyst, an NOx adsorption amount inside the NOx purifying device 15 can increase.

Further in the present embodiment, the heater 50 that heats fuel, and the temperature sensor 31 that detects a temperature (ambient temperature) inside the vaporizing chamber 30b are provided. The temperature adjusting portion at Step 30 of FIG. 14 controls the operation of the heater 50 according to a temperature detected by the temperature sensor 31 to adjust the temperature inside the vaporizing chamber 30b to the specified temperature range. Accordingly, the temperature inside the vaporizing chamber 30b is detected directly by the temperature sensor 31. Also, fuel in the vaporizing chamber 30b is heated directly by the heater 50. For that reason, it can be realized with high precision to adjust the temperature inside the vaporizing chamber 30b to the specified temperature range.

It should be noted that the specified equivalent ratio range where the cool flame reaction occurs may be different depending on the ambient temperature as shown in FIG. 10. Taking the above fact into consideration, the equivalent ratio controller at Step 40 of FIG. 14 changes the target equivalent ratio ϕtrg according to the detection temperature Tact. Hence, even when the detection temperature Tact is shifted from the target temperature Ttrg, since the equivalent ratio is adjusted according to the actual temperature inside the vaporizing chamber 30b, the cool flame reaction can surely occur.

Further, in the present embodiment, the target fuel flow rate Ftrg is set at Steps 44 and 47 of FIG. 14 based on a required flow rate of the reducing agent that is required by the NOx purifying device 15. The target air flow rate Atrg is set at Steps 41, 42, 43, 45 and 46 based on the target fuel flow rate Ftrg so that the equivalent ratio falls within the specified equivalent ratio range. For that reason, the equivalent ratio can be adjusted to the specified equivalent ratio range while satisfying the required flow rate of the reducing agent required by the NOx purifying device 15.

Further, according to the present embodiment, the cracking is generated by the heater 50 to thermally decompose fuel into a hydrocarbon compound having a small carbon number. Since the hydrocarbon compound having a small carbon number has a low boiling point, vaporized fuel can be suppressed to return to liquid form.

(Second Embodiment)

In the first embodiment illustrated in FIG. 1, air is supplied into the discharging reactor 20 by the air pump 20p. On the contrary, in a reducing agent supplying device according to the second embodiment illustrated in FIG. 18, a portion of intake air in the internal combustion engine 10 is supplied into the discharging reactor 20 through a bypassing route as described below.

Specifically, a branch pipe 36*h* connects between a portion of the intake passage 10*in* downstream of the compressor 11*c* and upstream of the cooler 12, and the fluid passage 22*a* of the discharging reactor 20. Also, a branch pipe 36*c* connects between a portion of the intake passage 10*in* downstream of the cooler 12, and the fluid passage 22*a*. A high temperature intake air without being cooled by the cooler 12 is supplied into the discharging reactor 20 through the branch pipe 36*h*. Whereas, a low temperature intake air after being cooled by the cooler 12 is supplied into the discharging reactor 20 through the branch pipe 36*c*.

An electromagnetic valve 36 that opens and closes an internal passage of the respective branch pipes 36*h* and 36*c* is attached to the branch pipes 36*h* and 36*c*. The operation of the electromagnetic valve 36 is controlled by the microcomputer 81. When the electromagnetic valve 36 is operated to open the branch pipe 36*h* and close the branch pipe 36*c*, the high temperature intake air flows into the discharging reactor 20. When the electromagnetic valve 36 is operated to open the branch pipe 36*c* and close the branch pipe 36*h*, the low temperature intake air flows into the discharging reactor 20.

The operation of the electromagnetic valve 36 switches the operational mode between a mode in which the high temperature intake air without being cooled by the cooler 12 branches off from an upstream of the cooler 12, and a mode in which the low temperature intake air after being cooled by the cooler 12 branches off from a downstream of the cooler 12. The mode for supplying the low temperature intake air is selected when the ozone is generated during the ozone generation mode or the high partial oxidation mode, whereby the generated ozone is prohibited from being destroyed by heat of the intake air. Whereas, the mode for supplying the high temperature intake air is selected when the ozone is not generated during the low partial oxidation mode or the stop mode, and fuel heated by the heater 50 is prohibited from being cooled by the intake air inside the reaction chamber.

During a period for which the electromagnetic valve 36 is opened, an amount of intake air into the combustion chambers of the internal combustion engine 10 is reduced by an amount of portions of the intake air that flow through the branch pipes 36*h* and 36*c*. For that reason, the microcomputer 81 corrects the opening of the throttle valve 13 or a compressing amount by the compressor 11*c* so that an amount of intake air flowing into the combustion chambers increases by the amount of the intake air flowing through the branch pipes 36*h* and 36*c* during the opening period of the electromagnetic valve 36.

In the present embodiment, the control for the air pump 20*p* described in the first embodiment and shown in FIGS. 12 to 16 is replaced with the control for the electromagnetic valve 36, but other controls are similarly executed as described in FIGS. 12 to 16. For example, the control at Step 46 of FIG. 14 in the first embodiment in which the air pump 20*p* is operated based on the target air flow rate Atrg is replaced with the control in the present embodiment in which the opening degree of the electromagnetic valve 36 is controlled based on the target air flow rate Atrg. In the present embodiment, the discharging reactor 20 and the electromagnetic valve 36 may serve as "ozone supplier".

According to the present embodiment, a portion of intake air compressed by the compressor 11 c is supplied into the discharging reactor 20. For that reason, air containing oxygen can be supplied into the discharging reactor 20 without using the air pump 20*p* as illustrated in FIG. 1.

(Third Embodiment)

Figure 18:
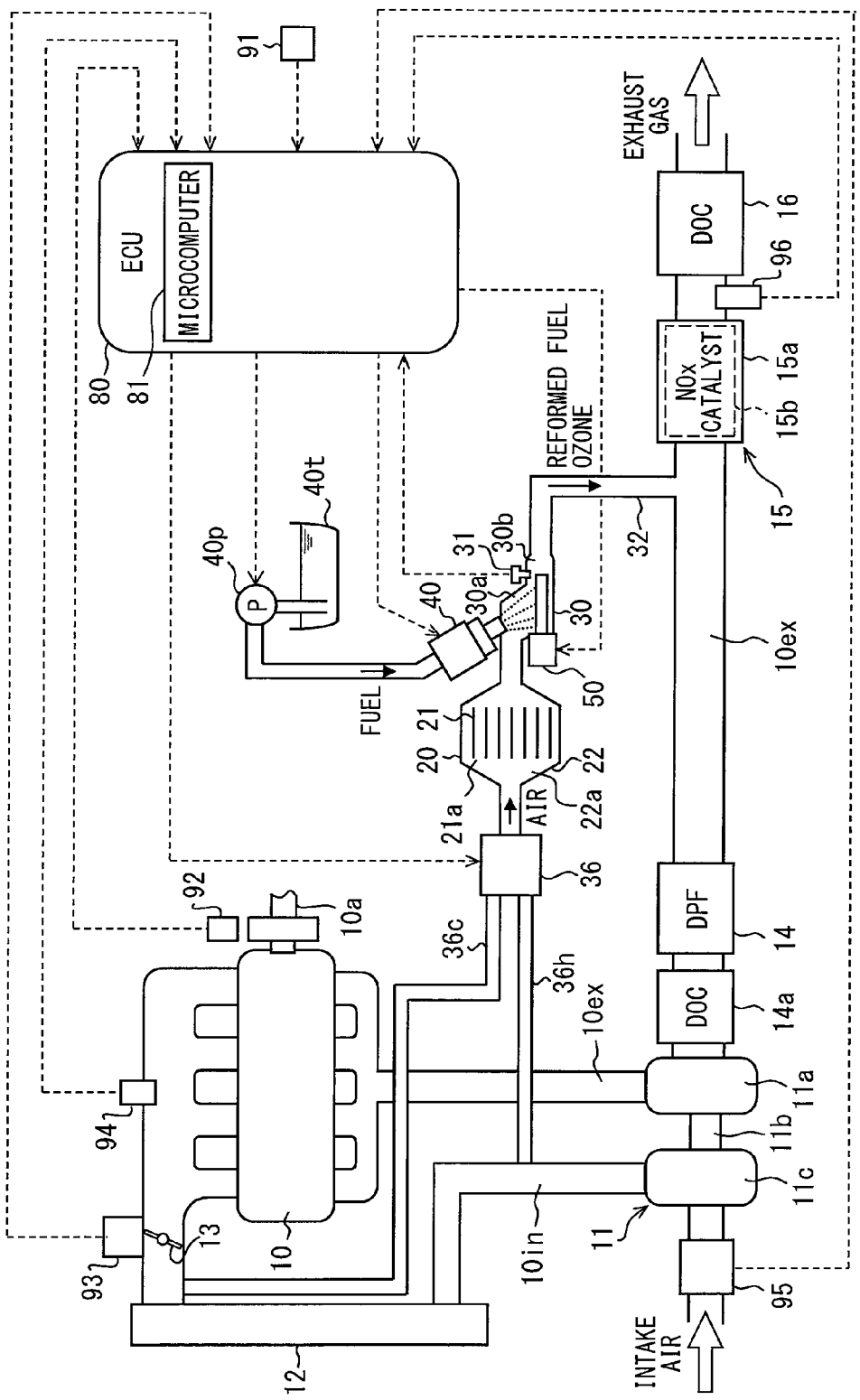
FIG. 18 is a schematic view of a reducing agent supplying device applied to a combustion system.
Figure 19:
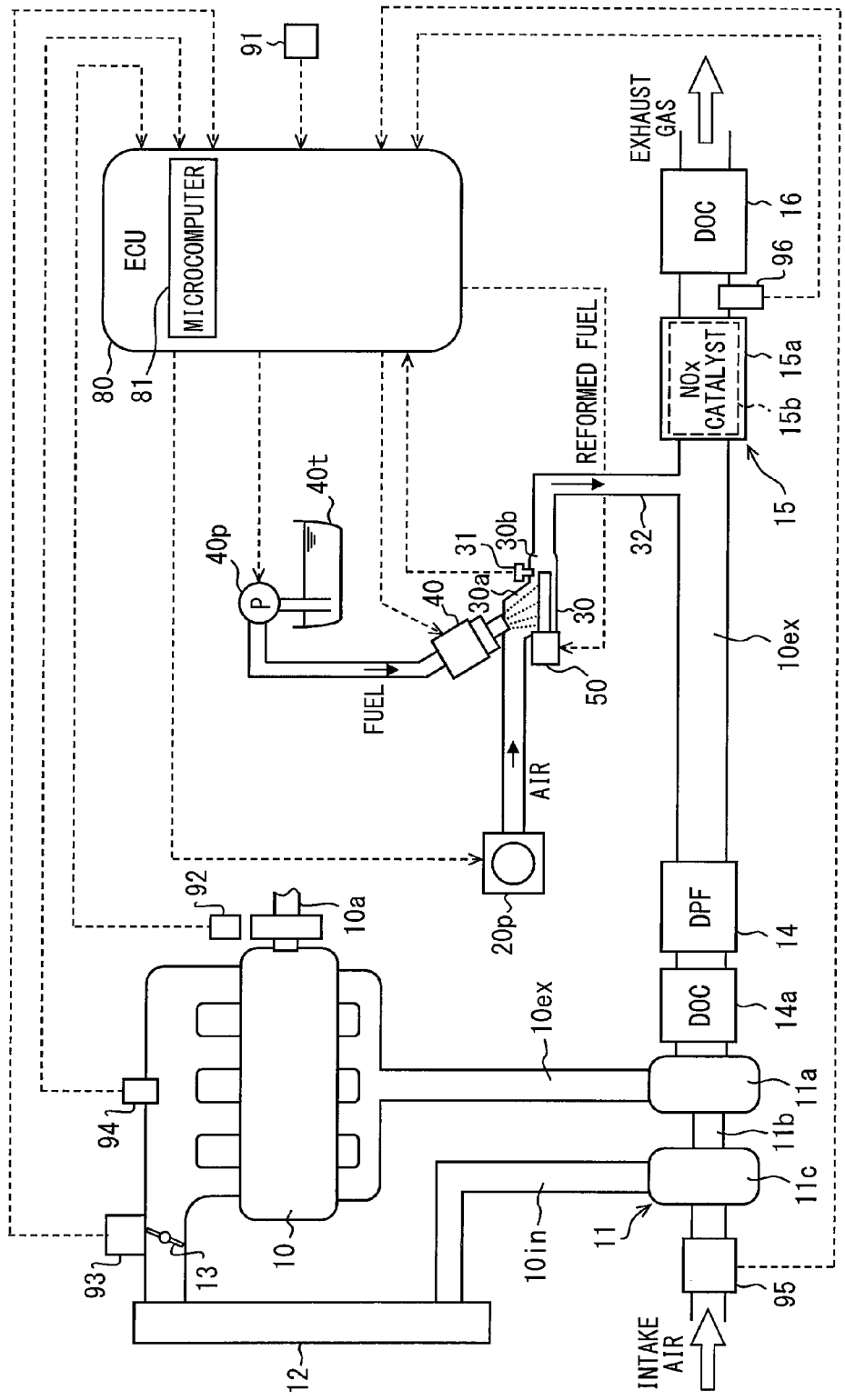
FIG. 19 is a schematic view of a reducing agent supplying device applied to a combustion system.

In the embodiments as illustrated in FIGS. 1 and 18, ozone is generated by the discharging reactor 20 and the generated ozone is supplied into the reaction container 30. Alternatively, in the third embodiment as shown in FIG. 19, the discharging reactor 20 is eliminated. Further, the control illustrated in FIG. 12 of the first embodiment is changed in the present embodiment as shown in FIG. 20.

Figure 20:
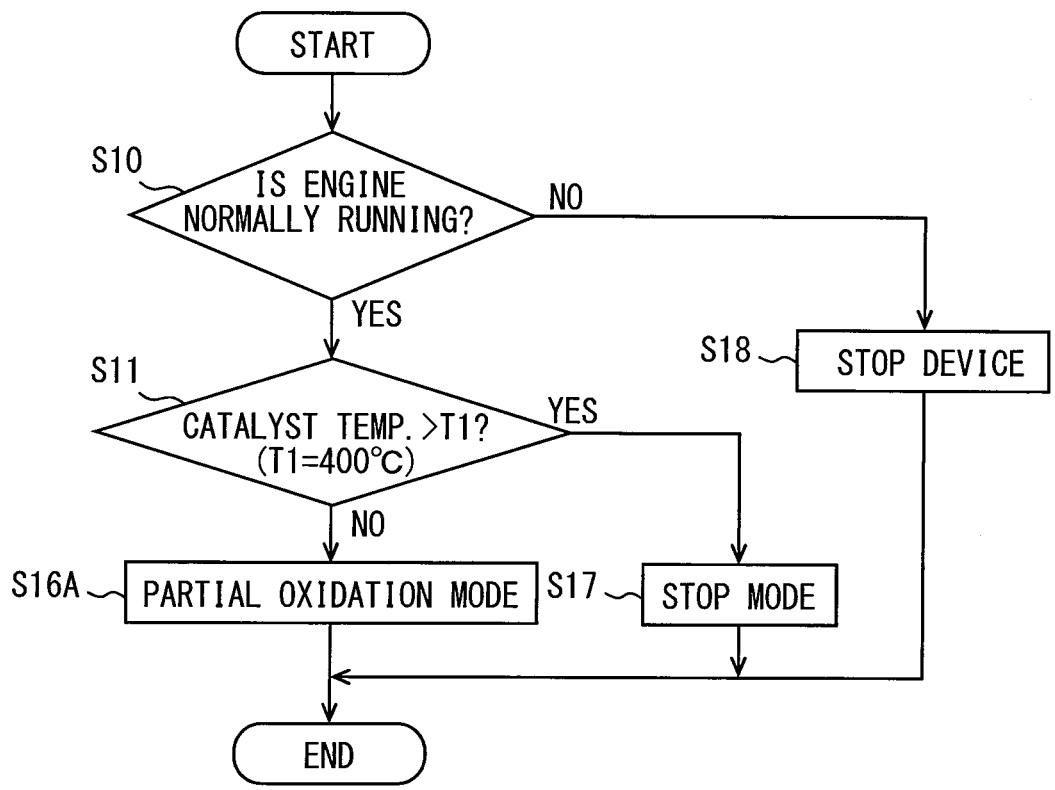
FIG. 20 is a flowchart illustrating a process to switch operation modes of the reducing agent supplying device illustrated in FIG. 19.

First, at Step 10 in FIG. 20, it is determined whether the internal combustion engine 10 is running. If false at Step 10, the reducing agent supplying device is stopped at Step 18. Specifically, power supply to the air pump 20*p*, the fuel injector 40 and the heater 50 is stopped. Whereas, if true at Step 10, the reducing agent supplying device is operated according to a temperature of the reducing catalyst (NOx catalyst temperature) inside the NOx purifying device 15.

More specifically, at Step 11, it is determined whether the NOx catalyst temperature is higher than the first specified temperature T1. For example, the first specified temperature T1 is set to 400° C. when the activation temperature T3 is 250° C. When the NOx catalyst temperature is lower than the first specified temperature T1, the reducing agent supplying device is operated with a partial oxidation mode at Step 16A, which will be described below. When the NOx catalyst temperature is higher than the first specified temperature T1, the reducing agent supplying device is operated with the stop mode at Step 17.

In short, since the discharging reactor 20 is eliminated in the present embodiment, the high partial oxidation mode described in the first embodiment is not executed. Thus, the operation of the reducing agent supplying device is switched between the partial oxidation mode and the stop mode. The process during the partial oxidation mode at Step 16A is the same as the low partial oxidation mode, i.e., the process at Step 16A is similar to the process shown in FIG. 15 without Step 54. The process during the stop mode of the present embodiment is the same as the process during the stop mode of the first embodiment, i.e., the process shown in FIG. 16.

According to the present embodiment, since the discharging reactor 20 is eliminated, downsizing of the device can be achieved.

(Other Embodiment)

In the first embodiment, the first specified temperature T1 and the second specified temperature T2 are set based on the first boundary temperature Ta and the second boundary temperature Tb, which are shown in the simulation result of FIG. 17. However, since the simulation result in FIG. 17 may be changed according to conditions, the first specified temperature T1 and the second specified temperature T2 may be set according to the conditions. For example, the first specified temperature T1 and the second specified temperature T2 may be set according to a concentration of NOx or oxygen, which flows into the NOx purifying device 15. Further, the first specified temperature T1 and the second specified temperature T2 may be set according to a ratio of NO and $NO_2$ contained in NOx flowing into the NOx purifying device 15. Furthermore, the first specified temperature T1 and the second specified temperature T2 may be set according to operating condition of the internal combustion engine 10.

In the above-described embodiments, the reformation of the reducing agent is stopped during the stop mode when the catalyst temperature is higher than the first specified temperature T1. Alternatively, an oxidation suppressing mode may be executed in place of stopping the reformation when the catalyst temperature is higher than the first specified temperature T1. In the oxidation suppressing mode, the reformation continues but the degree of reformation is suppressed. For example, the stop mode shown in FIG. 12 or 20 may be replaced with such an oxidation suppressing mode. In the oxidation suppressing mode, the degree of partial oxidation (reformation) is decreased in comparison with the low partial oxidation mode or the partial oxidation mode (i.e., a temperature of the reducing agent is lower than the first specified temperature T1). Specifically, the degree of reformation is suppressed by reducing a supply amount of air or exhaust gas into the reaction chamber. Alternatively, the degree of reformation may be suppressed by decreasing a temperature inside the vaporizing chamber 30b.

In the first embodiment, the ozone supply amount is controlled to increase during the high partial oxidation mode as a temperature of the reducing catalyst decreases. As with this control, a supply amount of air or exhaust gas may be controlled to increase during the low partial oxidation mode as a temperature of the reducing catalyst decreases.

During the stop mode, a heating amount by the heater 50 may be decreased or the heater 50 may be stopped. With this, oxidation of fuel can be surely stopped. As shown in FIG. 16, a temperature inside the reaction chamber may be adjusted to be within the specified temperature range even during the stop mode. In this case, when the operation mode is switched from the stop mode to the low partial oxidation mode or the partial oxidation mode, a temperature inside the reaction chamber has already been adjusted into the specified temperature range. Therefore, the partial oxidation can be rapidly executed.

In the embodiment illustrated in FIG. 1, the heater 50 is arranged within the reaction container 30. Alternatively, the heater 50 may be arranged outside of the reaction container 30 so that fuel or air is heated at a position upstream of the reaction container 30. Also, in the embodiment illustrated in FIG. 1, the temperature sensor 31 is arranged within the reaction container 30. Alternatively, the temperature sensor 31 may be arranged at a position downstream of the reaction container 30.

In the above-described embodiment as shown in FIG. 1, the fuel injector 40 is used as an atomizer that atomizes liquid fuel and supplies the atomized liquid fuel to the heater. Alternatively, a vibrating device that atomizes fuel in liquid form by vibrating the fuel may be used as the atomizer. The vibrating device may have a vibrating plate that vibrates at a high frequency and fuel is vibrated on the vibrating plate.

In the above-described embodiment illustrated in FIG. 18, intake air branches off from two portions of the intake passage 10in upstream and downstream of the cooler 12 through the branch pipes 36h and 36c. On the contrary, any one of the two branch pipes 36h and 36c may be eliminated, and the switching between the low temperature intake mode and the high temperature intake mode by the electromagnetic valve 36 may be also eliminated.

In the above-described embodiment as shown in FIG. 1, the reducing catalyst that physically adsorbs NOx (i.e., physisorption) is used in the NOx purifying device 15, but a reducing agent that chemically adsorbs NOx (i.e., chemisorption) may be used.

The NOx purifying device 15 may adsorb NOx when an air-fuel ratio in the internal combustion engine 10 is leaner than a stoichiometric air-fuel ratio (i.e., when the engine 10 is in lean combustion) and may reduce NOx when the air-fuel ratio in the internal combustion engine 10 is not leaner than the stoichiometric air-fuel ratio (i.e., when the engine 10 is in non-lean combustion). In this case, ozone is generated at the lean combustion and the reformed fuel is generated at the non-lean combustion. One of examples of a catalyst that adsorbs NOx at the lean combustion may be a chemisorption reducing catalyst made of platinum and barium carried by a carrier.

The reducing agent supplying device may be applied to a combustion system that has the NOx purifying device 15 without adsorption function (i.e., physisorption and chemisorption functions). In this case, in the NOx purifying device 15, an iron-based or copper-based catalyst may be used as the catalyst having the NOx reducing performance in a given specified temperature range in the lean combustion, and the reformed fuel may be supplied to those catalysts as the reducing agent.

In the above-described embodiment, the NOx catalyst temperature used at Steps 11, 12 and 13 of FIG. 12 is estimated based on the exhaust temperature detected by the exhaust temperature sensor 96. However, a temperature sensor may be attached to the NOx purifying device 15, and the temperature sensor may detect directly the NOx catalyst temperature. Or, the NOx catalyst temperature may be estimated based on a rotational speed of the output shaft 10a and an engine load of the internal combustion engine 10.

In the above-described embodiment as shown in FIG. 1, the discharging reactor 20 has the electrodes 21, each of which has a plate shape and faces each other in parallel. However, the discharging reactor 20 may have an acicular electrode (pin electrode) protruding in an acicular manner and an annular electrode annularly surrounding the acicular electrode.

In the above-described embodiment as shown in FIG. 1, the reducing agent supplying device is applied to the combustion system that is installed in a vehicle. However, the active substance supplying system may be applied to a stationary combustion system. Further, in the embodiment as shown in FIG. 1, the reducing agent supplying device is applied to a compression self-ignition diesel engine, and diesel for combustion is used as the reducing agent. However, the reducing agent supplying device may be applied to a self-ignition gasoline engine, and gasoline for combustion may also be used for the reducing agent.

Means and functions provided by the microcomputer may be provided by, for example, only software, only hardware, or a combination thereof. The microcomputer may be constituted by, for example, an analog circuit.

What is claimed is:

1. A reducing agent supplying device for a fuel combustion system that includes a NOx purifying device with a reducing catalyst arranged in an exhaust passage to purify NOx contained in exhaust gas of an internal combustion engine, the reducing agent supplying device supplying a reducing agent into the exhaust passage at a position upstream of the reducing catalyst, the reducing agent supplying device comprising:

a reaction container that reforms the reducing agent by partially oxidizing the reducing agent; and a microcomputer comprising a reformation suppressing portion that, when a temperature of the reducing agent is higher than a first specified temperature that is equal to or higher than an activation temperature of the reducing catalyst, (i) suppresses the degree of reformation of the reducing agent in comparison with when a temperature of the reducing agent is lower than the first specified temperature, or (ii) stops the reformation of the reducing agent.

2. The reducing agent supplying device according to claim 1, further comprising
an ozone supplier that supplies ozone to the reducing agent to reform the reducing agent under an ozone-present environment, and
an ozone controller that controls the ozone supplier to supply the ozone when a temperature of the reducing catalyst is lower than a second specified temperature that is equal to or higher than the activation temperature and lower than the first specified temperature.

3. The reducing agent supplying device according to claim 2, wherein
the ozone controller controls the ozone supplier to increase a supply amount of the ozone as a temperature of the reducing catalyst decreases.

4. The reducing agent supplying device according to claim 1, wherein
the reaction container defines therein a reaction chamber inside which the reducing agent is partially oxidized with oxygen, and
the reformation suppressing portion suppresses the degree of reformation of the reducing agent or stops the reformation of the reducing agent by decreasing or discontinuing oxygen supply into the reaction chamber.

5. The reducing agent supplying device according to claim 4, further comprising
an equivalent ratio controller that adjusts an equivalent ratio of the reducing agent and air, which are supplied into the reaction chamber, to be within a specified equivalent ratio range, wherein
the microcomputer further comprises a temperature adjusting portion that adjusts a temperature inside the reaction chamber to be within a specified temperature range, and
the specified equivalent ratio range and the specified temperature range are set such that a cool flame reaction is generated through which the reducing agent inside the reaction chamber is partially oxidized with oxygen inside the air.

6. The reducing agent supplying device according to claim 4, further comprising
a valve that is disposed in an air supply passage through which air is supplied into the reaction chamber, wherein
the valve is operated to close the air supply passage when the reformation suppressing portion stops the reformation of the reducing agent.

* * * * *